United States Patent
Kawamura et al.

Patent Number: 5,459,616
Date of Patent: Oct. 17, 1995

[54] TWO-UNIT ZOOM LENS SYSTEM

[75] Inventors: Kazuteru Kawamura; Yasuji Ogata, both of Tokyo, Japan

[73] Assignee: Olympus Optical Co., Ltd., Tokyo, Japan

[21] Appl. No.: 19,286

[22] Filed: Feb. 18, 1993

[30] Foreign Application Priority Data

Feb. 18, 1992 [JP] Japan .................................. 4-030756
Mar. 5, 1992 [JP] Japan .................................. 4-048265

[51] Int. Cl.$^6$ ................................................. G02B 15/14
[52] U.S. Cl. ........................................... 359/692; 359/690
[58] Field of Search .................................... 359/692, 683, 359/686, 687, 688, 690

[56] References Cited

U.S. PATENT DOCUMENTS

| | | | |
|---|---|---|---|
| 4,772,106 | 9/1988 | Ogata et al. | 359/692 |
| 4,936,661 | 6/1990 | Betensky et al. | 359/692 |
| 5,109,299 | 4/1992 | Kato | 359/692 |
| 5,113,287 | 5/1992 | Nakayama | 359/683 |

FOREIGN PATENT DOCUMENTS

| | | |
|---|---|---|
| 62-138818 | 6/1987 | Japan . |
| 63-311224 | 12/1988 | Japan . |
| 3-116110 | 5/1991 | Japan . |

*Primary Examiner*—Georgia Y. Epps
*Assistant Examiner*—Michael A. Papalas
*Attorney, Agent, or Firm*—Cushman, Darby & Cushman

[57] ABSTRACT

The invention provides a two-unit or positive-negative type of zoom lens that has a zoom range of the order of 38–70 mm, comprises six lens groups or six lenses, and makes use of an aspherical plastic lens for cost reduction and for improving its performance as well. This zoom lens system is constructed from a first unit I of positive power and a second unit II of negative power and is designed to be variable in the air space between both the units for zooming. The first unit I includes a positive meniscus lens L1 convex on the object side, a negative lens L2, a positive lens L3 and a lens L4, and the second unit II includes a positive meniscus lens L5 convex on the image side and a negative meniscus lens L6 convex on the image side. At least L5 consists of a plastic lens having an aspherical surface.

3 Claims, 18 Drawing Sheets

F.NO 8.00

−0.5　0.5
Spherical
aberration

ω 17.73°

−0.5　0.5
Astigmatism

ω 17.73°

−5.0　5.0
Distortion(%)

ω 17.73°

−0.05　0.05
Chromatic
aberration of
magnification

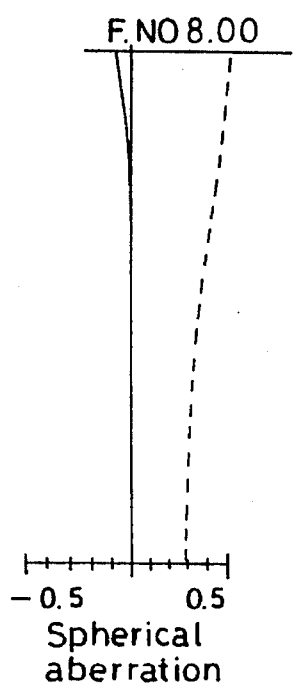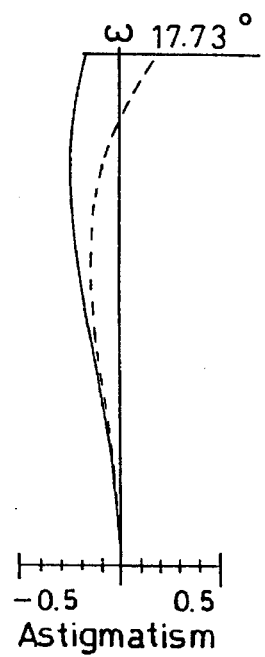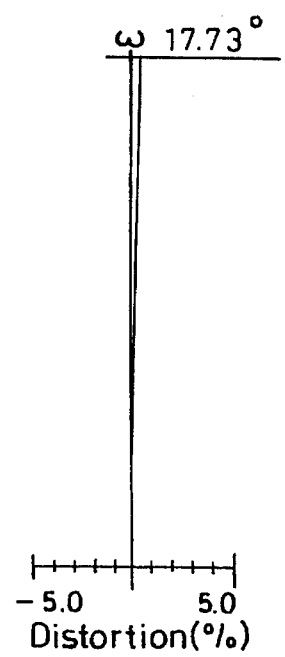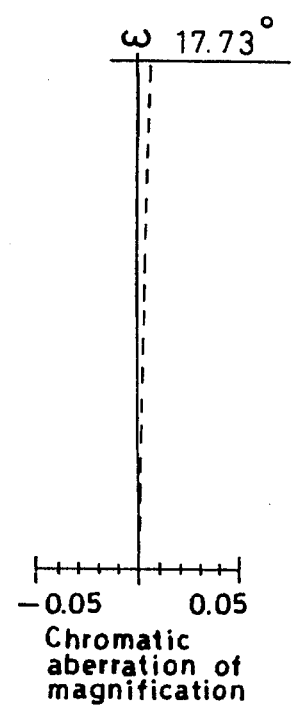

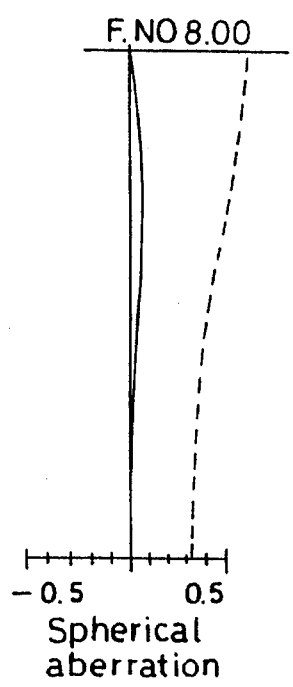 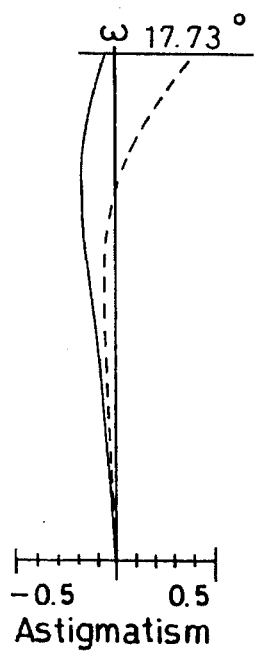 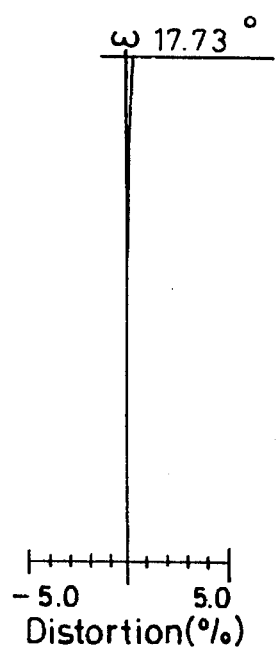 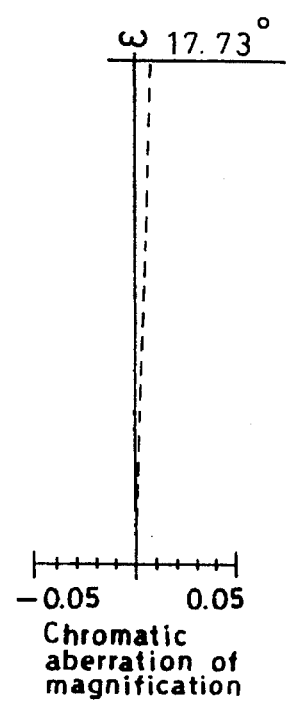

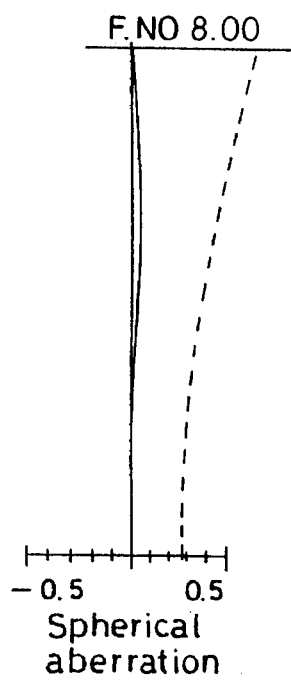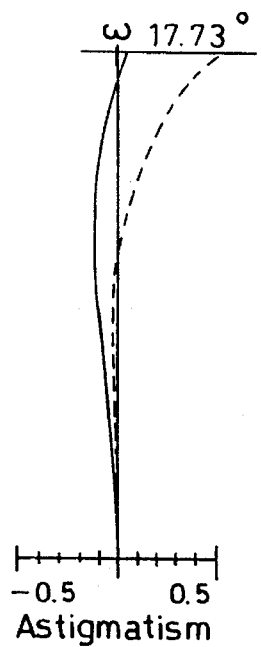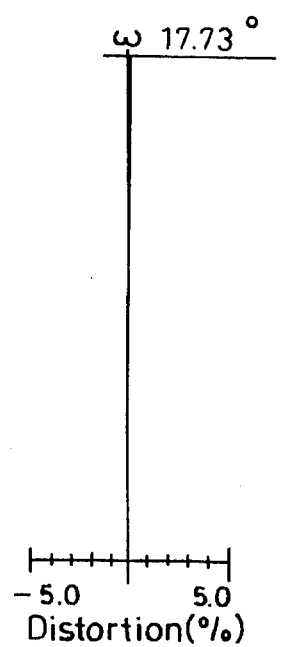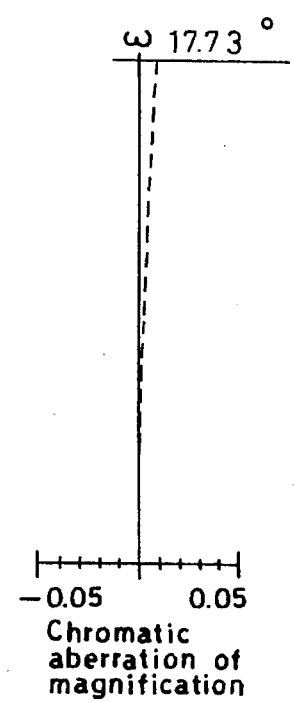

Spherical aberration

Astigmatism

Distortion(%)

Chromatic aberration of magnification

Spherical aberration

Astigmatism

Distortion(%)

Chromatic aberration of magnification

F.NO 8.00

−0.5  0.5
Spherical aberration

ω 17.73°

−0.5  0.5
Astigmatism

ω 17.73°

−5.0  5.0
Distortion(%)

ω 17.73°

−0.05  0.05
Chromatic aberration of magnification

F.NO 4.66
Spherical aberration

ω 28.78°
Astigmatism

ω 28.78°
Distortion (%)

ω 28.78°
Chromatic aberration of magnification

F.NO 6.11
Spherical aberration

ω 22.78°
Astigmatism

ω 22.78°
Distortion (%)

ω 22.78°
Chromatic aberration of magnification

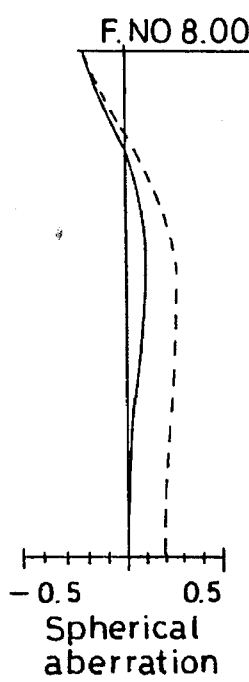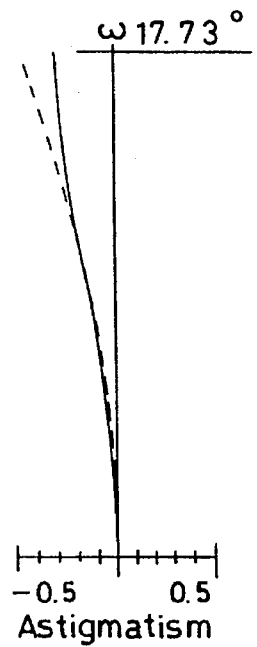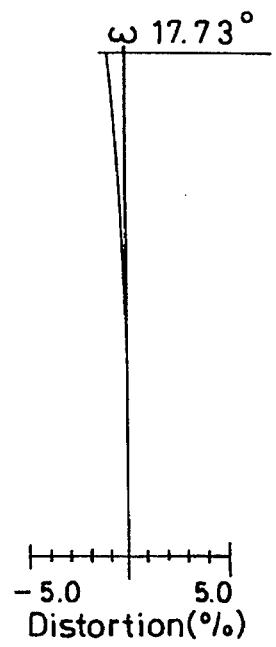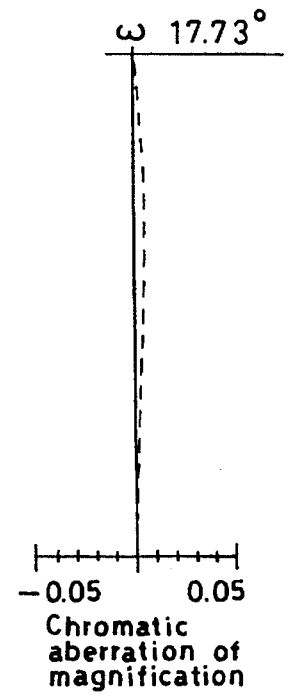

F.NO 4.08
−0.5    0.5
Spherical aberration

ω 28.78°
−0.5    0.5
Astigmatism

ω 28.78°
−5.0    5.0
Distortion (%)

ω 28.78°
−0.05    0.05
Chromatic aberration of magnification

F.NO 5.71
−0.5    0.5
Spherical aberration

ω 22.92°
−0.5    0.5
Astigmatism

ω 22.92°
−5.0    5.0
Distortion (%)

ω 22.92°
−0.05    0.05
Chromatic aberration of magnification

F.NO 8.00
−0.5　0.5
Spherical aberration

ω 15.63°
−0.5　0.5
Astigmatism

ω 15.63°
−5.0　5.0
Distortion(%)

ω 15.63°
−0.05　0.05
Chromatic aberration of magnification

TWO-UNIT ZOOM LENS SYSTEM

BACKGROUND OF THE INVENTION

The present invention relates generally to a zoom lens system, and more particularly to a two-unit zoom lens system that comprises six groups, each consisting of one lens, and has a zoom ratio of about 2. This two-unit zoom lens system is best suited for lens shutter cameras having an unlimited back focus length, and so on.

So far, two-unit or positive-negative, or three-unit or positive-positive-negative and negative-positive-negative types of zoom lenses have been known as typical zoom lenses for lens shutter cameras.

The "two-unit" mentioned above means the minimum unit number that can achieve zooming, and so many approaches have now been proposed of two-unit zoom lenses, because of their possibilities of making lens barrels and driving mechanisms simple and reducing the number of the lenses involved.

However, the two-unit type of zoom lens has been considered to be unsuitable for attaining high zoom ratios, partly because the amount of movement of each unit is likely to increase in association of zooming and partly because aberration variations incidental to zooming are large (this is particularly true of the curvature of field at an intermediate focal length).

The three-unit type of zoom lens, on the other hand, lends itself well fit for attaining high zoom ratios, partly because each unit can share a zoom ratio to reduce its amount of movement in association with zooming and partly because aberration variations can be well corrected. Because of comprising three lens units, however, they have some demerits, for instance, their lens barrel structures and driving mechanisms being likely to become complicated, an increased number of lenses, and so on.

As will be referred to later, an object of the invention is to obtain an inexpensive zoom lens system that comprises a reduced number of lenses and makes use of plastic material. In other words, it has now been found that a purposive lens system, if it is allowed to have a zoom ratio of at most about 2, is achievable by taking advantage of the "two-unit" type.

Until now such a two-unit type of zoom lenses comprising about six lenses have been known from JP-A-62-138818, 63-266413, 63-311224, 2-73322, 2-120714, 3-116110, and so on.

Of these, the zoom lenses set forth in JP-A-62-138818, 63-266413 and 63-311224 use aspherical glass lenses for aberration correction, and are of good-enough performance. However, the use of aspherical glass lenses is still unfavorable in terms of cost, in spite of recent considerable progresses made in technology.

The zoom lenses shown in JP-A-2-73322 and 2-120714 are all constructed from polished glass lenses, and so are improved in terms of cost over the first-mentioned three zoom lens systems, but are less than satisfactory in terms of spherical aberration and coma correction.

The zoom lens system referred to in JP-A-3-116110 comprises five lens groups or six lenses, and utilizes plastic lenses for cost reduction. However, the use of a positive lens, a negative lens and a cemented positive lens of positive and negative powers renders spherical aberration and coma correction insufficient. In addition, its focal length at the telephoto end is as short as 60 mm.

SUMMARY OF THE INVENTION

In view of such situations as mentioned above, an object of the invention is to provide a two-unit zoom lens system which has a zoom range of the order of 38–70 mm, and comprises six lens groups or six lenses, and in which an aspherical plastic lens is used for cost reduction and for improving its performance as well.

According to one aspect of the invention, the abovementioned object is achieved by the provision of a two-unit zoom lens system which comprises in order from the object side:

a first lens unit including four lens elements or a first lens element that is a positive meniscus lens convex on the object side, a second lens element that is a negative lens, a third lens element that is a positive lens and a fourth lens element and having a positive power as a whole, and a second lens unit including a front lens element that is a positive meniscus lens convex on the image side and a rear lens element that is a negative meniscus lens convex on the image side, and having a negative power as a whole, said front lens element consisting of a plastic lens, and the space between both said lens units being variable for zooming.

According to another aspect of the invention, there is provided a two-unit zoom lens system which comprises in order from the object side:

a first lens unit including four lens elements or a first lens element that is a positive meniscus lens convex on the object side, a second lens element that is a negative lens, a third lens element that is a positive lens and a fourth lens element that is a positive lens and having a positive power as a whole, and a second lens unit including a front lens element that is a positive meniscus lens convex on the image side and a rear lens element that is a negative meniscus lens convex on the image side, and having a negative power as a whole, the space between said first and second lens units being variable for zooming, said front lens element consisting of a plastic lens having an aspherical surface, and said two-unit zoom lens system conforming to the following conditions (1) and (2'):

$$0.6 < f_1/f_W < 0.9 \quad (1)$$

$$0.6 < |f_2/f_W| < 0.9 \quad (2')$$

where $f_1$ is the focal length of said first lens unit, $f_2$ is the focal length of said second lens unit, and $f_W$ is the focal length of the total system at the wide-angle end.

According to a further aspect of the invention, there is provided a two-unit zoom lens system which comprises in order from the object side:

a first lens unit including four lens elements or a first lens element that is a positive meniscus lens convex on the object side, a second lens element that is a negative lens, a third lens element that is a positive lens and a fourth lens element that is a meniscus lens convex on the image side and having a positive power as a whole, and a second lens unit including a front lens element that is a positive meniscus lens convex on the image side and a rear lens element that is a negative meniscus lens convex on the image side, and having a negative power as a whole, the space between said first and second lens units being variable for zooming, said fourth and front lens elements each consisting of a plastic lens having an aspherical surface, and said two-unit zoom lens system conforming to the following conditions (1) and (2):

$$0.6 < f_1/f_W < 0.9 \quad (1)$$

$$0.5 < |f_2/f_W| < 0.9 \quad (2)$$

where $f_1$ is the focal length of said first lens unit, $f_2$ is the focal length of said second lens unit, and $f_W$ is the focal length of the total system at the wide-angle end.

Reference will now be made to why such lens arrangements as mentioned above are adopted and how they act.

With such lens arrangements as mentioned above, it is possible to correct aberrations over the total range from the wide-angle to telephoto end and in a well-balanced state as well.

It is possible to well correct spherical aberration and coma in particular by locating the positive lens and the aspherical meniscus lens—convex on the image side—on the image side of the negative lens that is the second lens of the first lens unit.

When using a plastic lens, care should be taken of a focal point displacement that may be caused by temperature and humidity changes. To keep this focal point displacement small, it is desired to reduce the power of the plastic lens as much as possible. According to the invention, effective correction of spherical aberration and coma is achieved by constructing the final lens of the first lens unit—that is located in front of a stop—from an aspherical plastic lens, while the power is kept very small.

Also, well correction of astigmatism and distortion is achieved by constructing the second lens unit from an aspherial, positive meniscus, plastic lens on convex on the image side and a negative meniscus lens convex on the image side and keeping the power of the aspherical, positive meniscus lens small as well.

Thus, of the six lens groups or six lenses, two are plastic lenses, but the lens system made by the invention is little susceptible to focal point displacements due to temperature and humidity changes, and is not only of good-enough performance but also inexpensive.

A primary target of the invention is to achieve cost reduction but, in order to achieve this, it is as a matter of course necessary to make the lens system compact. The conditional formulae (1) and (2), mentioned below, are presented for showing the conditions for compactness. Included in the factors contributing to compactness are (i) a reduction in the total length of the lens system, (ii) a reduction in the amount of movement of each unit in association with zooming, (iii) a lens diameter reduction, and so on. Making a camera compact is not achieved without meeting these.

As mentioned above, the reduction in the total length of the lens system is attained by decreasing the number of the lenses involved. In order to reduce the amount of movement of each unit and achieve the lens diameter reduction, on the other hand, there is a need of making power sharing proper. This is defined by the following conditional formulae (1) and (2):

$$0.6 < f_1/f_W < 0.9 \quad (1)$$

$$0.5 < |f_2/f_W| < 0.9 \quad (2)$$

Here $f_1$ is the focal length of said first lens unit, $f_2$ is the focal length of said second lens unit, and $f_W$ is the focal length of the total system at the wide-angle end.

Calling $f_1$ and $f_2$ the focal lengths of the first and second units, $f_W$ and $f_{BW}$ the focal length and back focus of the total system at the wide-angle end, $\beta_{2W}$ the image-formation magnification of the second unit, Z the zoom ratio and $\Delta_1$ and $\Delta_2$ the amounts of movement of the first and second units in association with zooming, we have $$f_W = f_1 \cdot \beta_{2W} \quad (A)$$

$$f_{BW} = f_1 \cdot (1 - \beta_{2W}) \quad (B)$$

$$\Delta_1 = (1 - Z)f_2\{\beta_{2W} - 1/(Z \cdot \beta_{2W})\} \quad (C)$$

$$\Delta_2 = (1 - Z)f_2 \cdot \beta_{2W} \quad (D)$$

At higher than the upper limit of Formula (1), $\beta_{2W}$ approximates to 1, and so the back focus is extremely short, as can be seen from Formula (B). As a result, not only is the lens diameter of the second unit increased, but flare, etc., are likely to take place by reflection from the final lens surface and film plane. At less than the lower limit of Formula (1), on the other hand, the power of the first lens becomes too strong, resulting in aberration degradations in the case of the lens arrangements according to the invention.

Exceeding the upper limit of Formula (2) or a reduction in the power of the second unit is not preferable, because the amount of movement of each unit is increased, as can be seen from Formulae (C) and (D). Falling short of the lower limit of Formula (2) or an increase in the power of the second unit makes it impossible to achieve well-enough correction of aberrations in the case of the lens arrangements according to the invention.

More preferably, the following conditional formula (2') rather than Formula (2) should be satisfied:

$$0.6 < |f_2/f_W| < 0.9 \quad (2')$$

Furthermore, it is desired that the following formula (3):

$$0.05 < |d_{11}/f_2| < 0.4 \quad (3)$$

be satisfied. Here $d_{11}$ is the air space between the positive meniscus lens—convex on the image side—and the negative meniscus lens—convex on the image side—of the second unit. Formula (3) concerns astigmatism correction, and teaches that at less than the lower limit there is large astigmatism at the wide-angle end. At higher than the upper limit, on the other hand, the total length of the lens system is large.

Here, too, it is more desired to conform to the following conditional formula (3') rather than Formula (3):

$$0.08 < |d_{11}/f_2| < 0.4 \quad (3')$$

In the invention, a plastic lens is used for the positive meniscus lens in the second unit that is convex on the image side. When a meniscus lens convex on the image side is used for the fourth lens of the first unit, it is again preferable to construct this meniscus lens from a plastic lens. In order to make these plastic lenses less susceptible to temperature and humidity changes, they should preferably conform to the following conditional formulae (4) and (5):

$$2.5 < |f_{LA}/f_1| \quad (4)$$

where $f_{LA}$ is the focal length of the meniscus lens of the first unit that is convex on the image side, and $$1.5 < |f_{LS}/f_2| \quad (5)$$

where $f_{LS}$ is the focal length of the positive meniscus lens of the second unit that is convex on the image side.

Let us call $v_{LS}$ the Abbe's number of the positive meniscus lens of the second unit. Then, it is desired in view of chromatic aberration correction that the following formula (6) be satisfied:

$$v_{LS} > 50 \quad (6)$$

In the case of the positive meniscus lens of the second unit, some degree of freedom is obtained in aberration correction by making one or both surfaces thereof aspherical. In this case, however, it is preferable that at leas one surface has an aspherical configuration that increases in positive power as it is spaced away from the optical axis.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 4(a)–4(l) are aberration diagrams in Example 2, that are arranged similar to FIG. 3, FIGS. 5(a)–5(l) are aberration diagrams in Example 3, that are arranged similar to FIG. 3, FIGS. 6(a)–6(l) are aberration diagrams in Example 4, that are arranged similar to FIG. 3, FIGS. 7(a)–7(l) are aberration diagrams in Example 5, that are arranged similar to FIG. 3, FIGS. 8(a)–8(l) are aberration diagrams in Example 6, that are arranged similar to FIG. 3, FIGS. 9(a)–9(l) are aberration diagrams in Example 7, that are arranged similar to FIG. 3, and FIGS. 10(a)–10(l) are aberration diagrams in Example 8, that are arranged similar to FIG. 3.

DESCRIPTION OF THE PREFERRED EMBODIMENTS

Figure 1A:
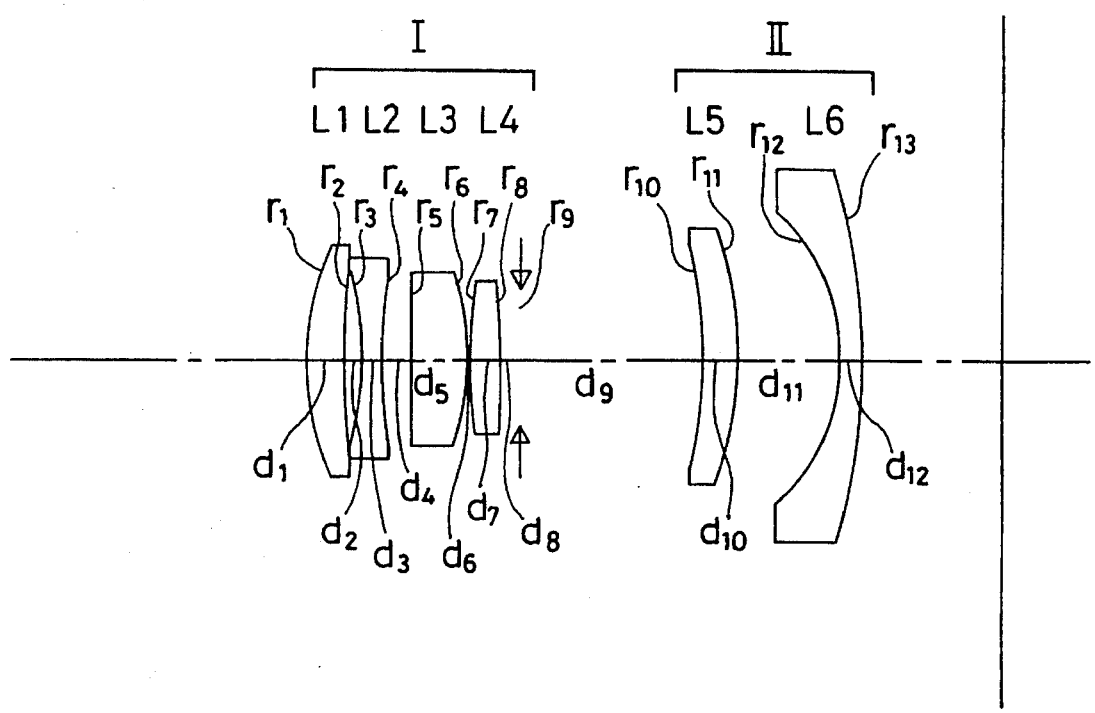
FIGS. 1(a) and 1(b) represent a lens arrangement in section of Example 1 of the two-unit zoom lens system according to the invention at the wide-angle and telephoto ends respectively.
Figure 1B:
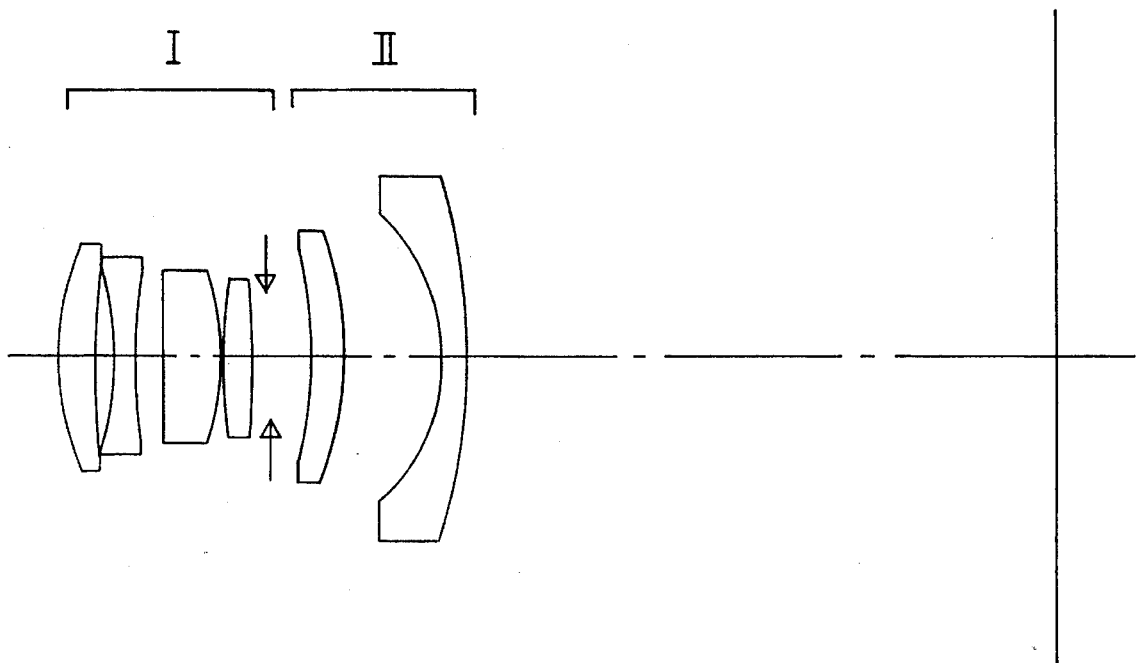
Figure 2A:
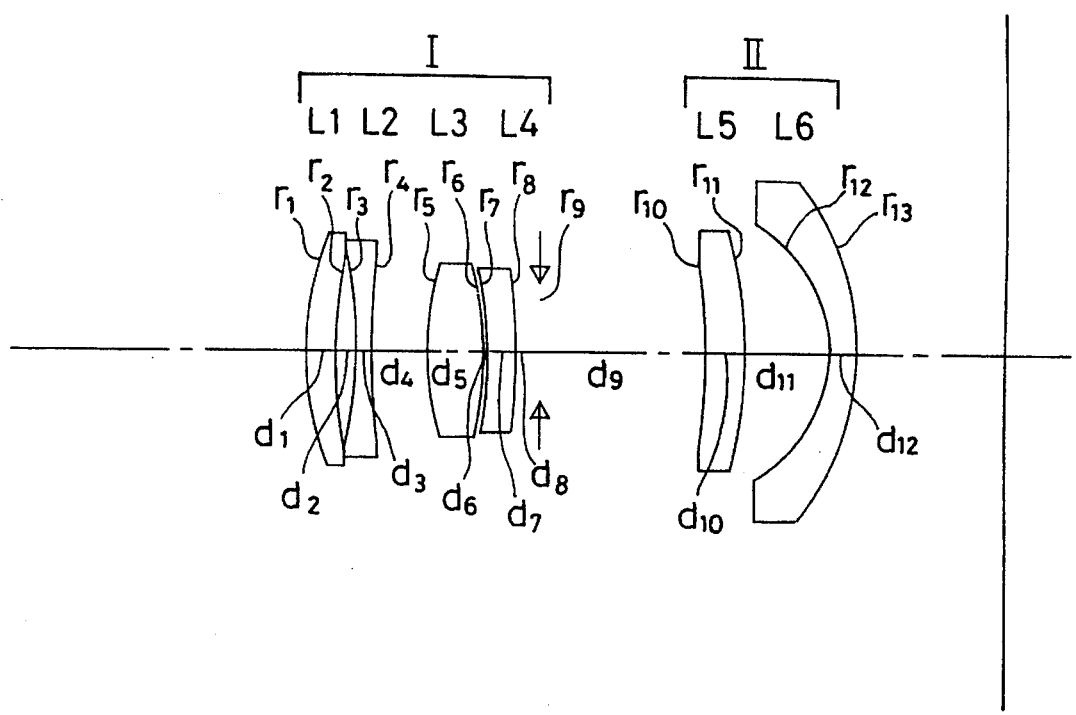
FIGS. 2(a) and 2(b) are sectional representations similar to FIG. 1 that shows Example 5 of the invention.
Figure 2B:
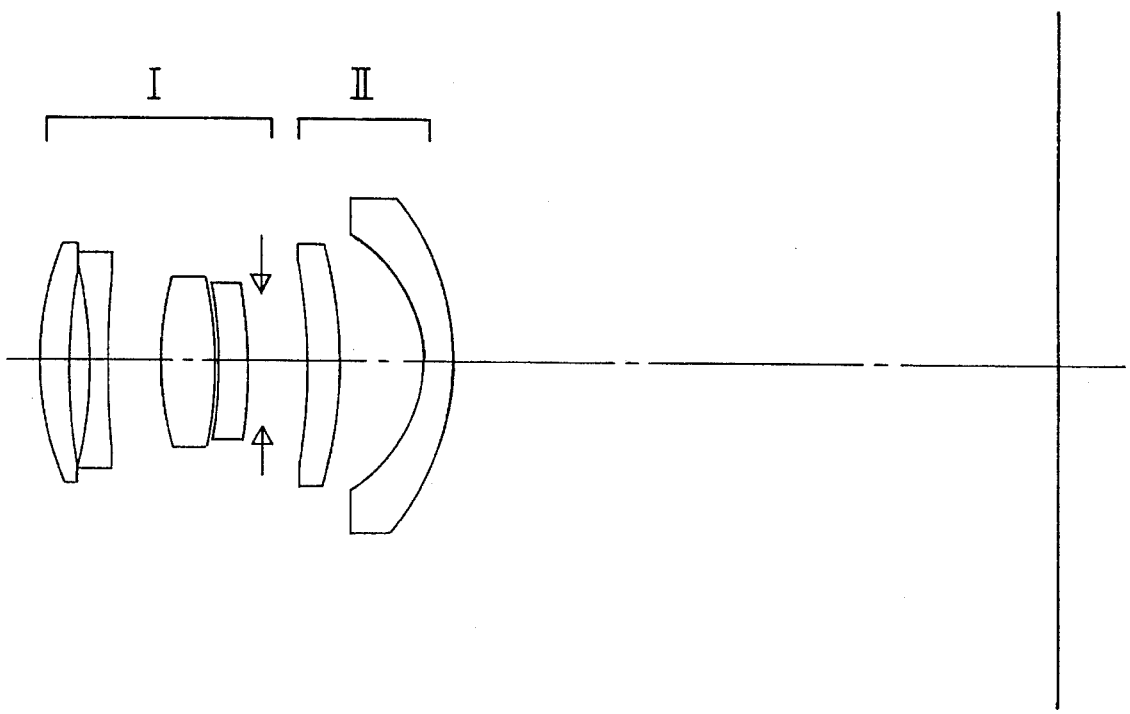
Figure 3A:
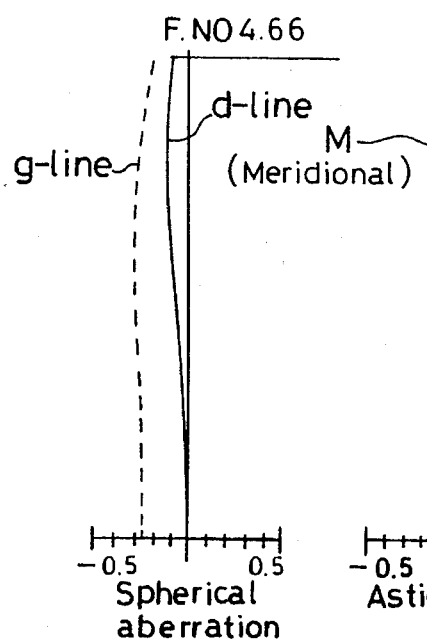
FIGS. 3(a)–3(l) are aberration diagrams showing spherical aberration, astigmatism, distortion and chromatic aberration of magnification in Example 1 at the wide-angle end (a), (b), (c), and (d) standard setting (e), (f), (g) and (h) and telephoe end (i), (j), (k) and (l)
Figure 3B:
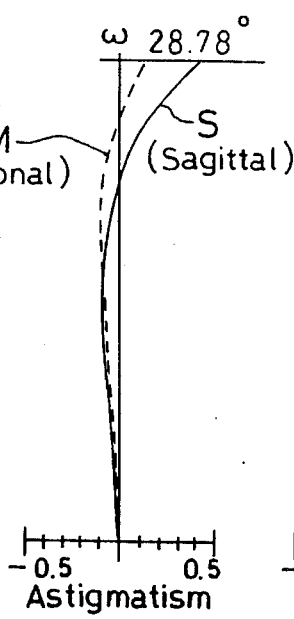
Figure 3C:
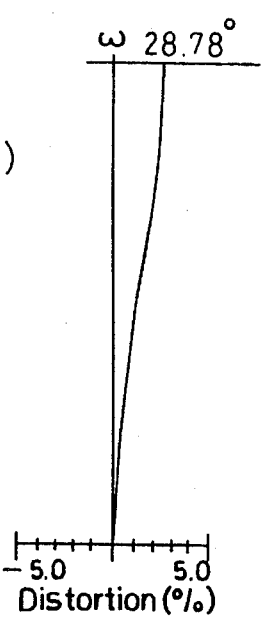
Figure 3D:
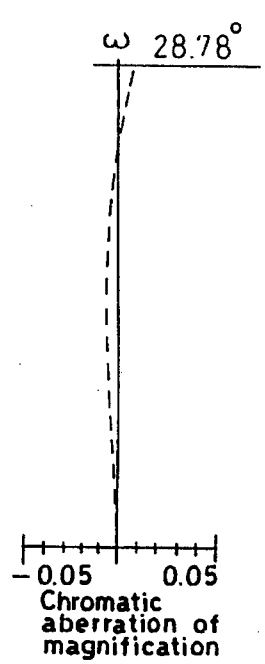
Figure 3E:
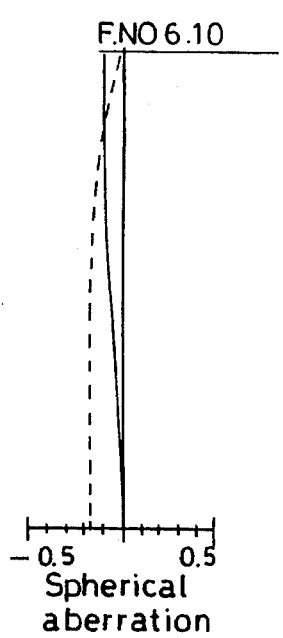
Figure 3F:
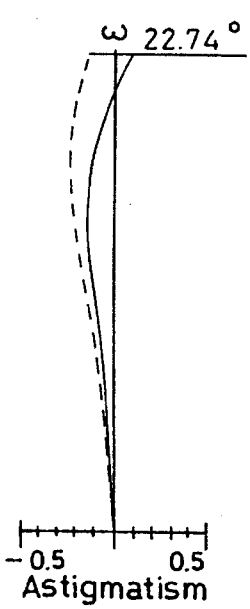
Figure 3G:
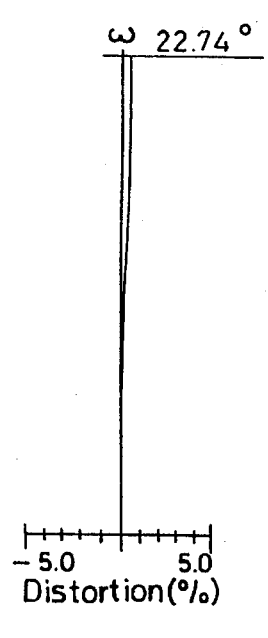
Figure 3H:
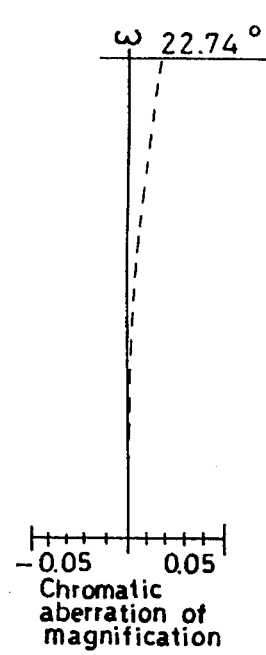
Figure 3I:
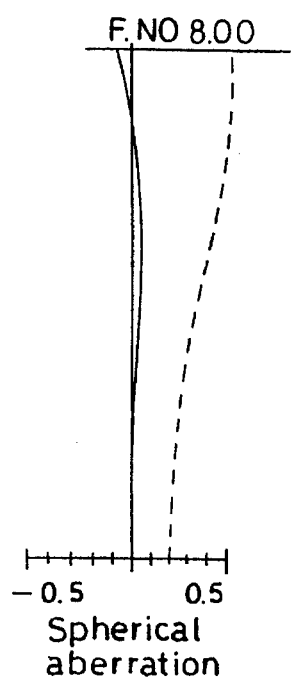
Figure 3J:
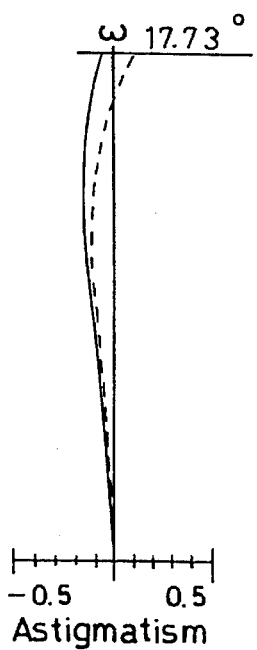
Figure 3K:
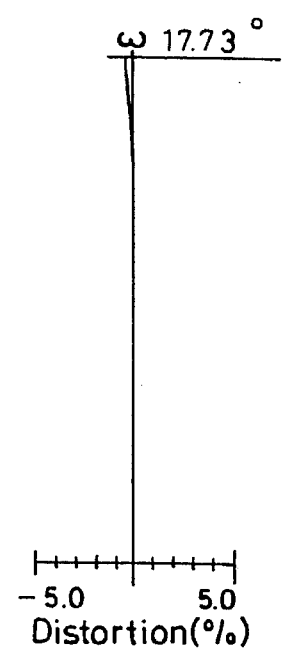
Figure 3L:
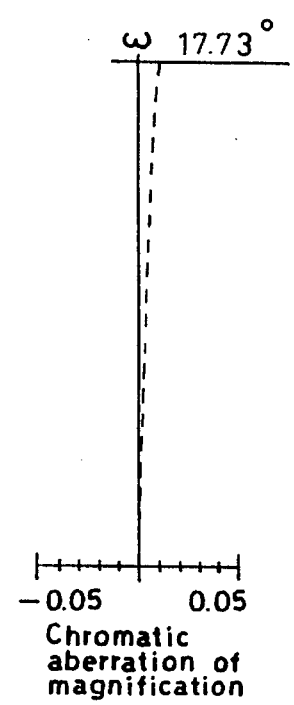
Figure 4A:
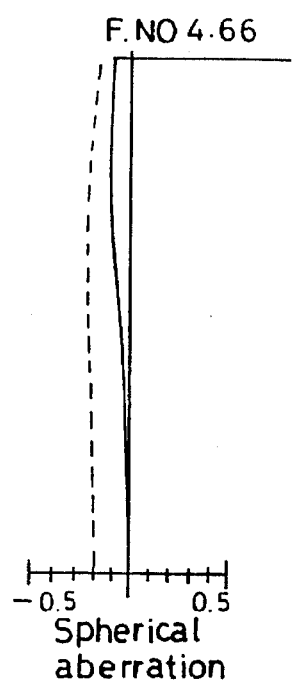
Figure 4B:
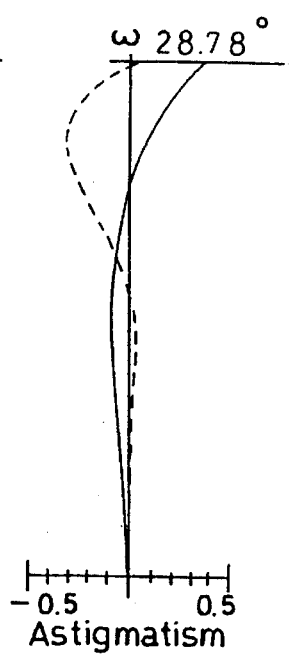
Figure 4C:
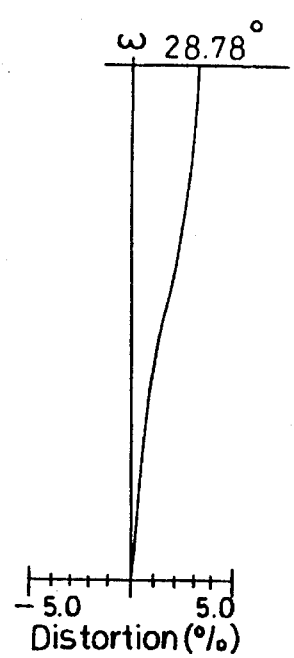
Figure 4D:
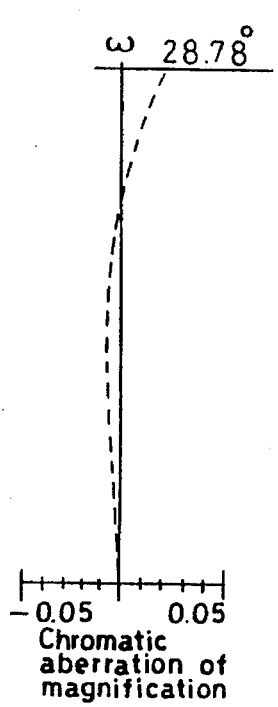
Figure 4E:
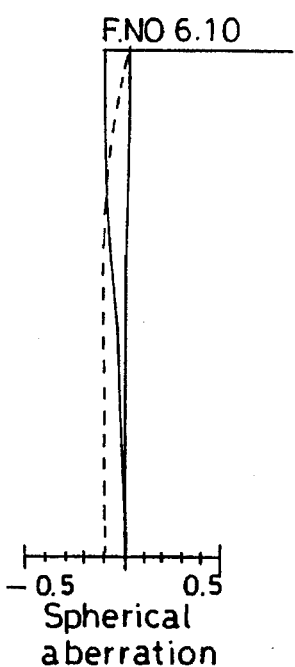
Figure 4F:
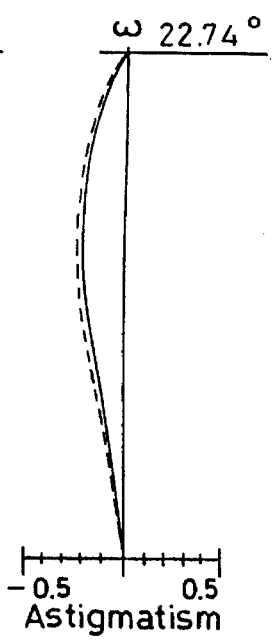
Figure 4G:
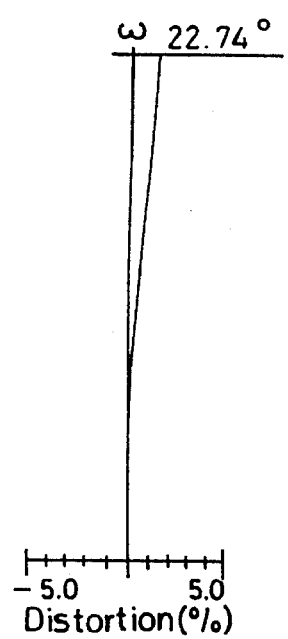
Figure 4H:
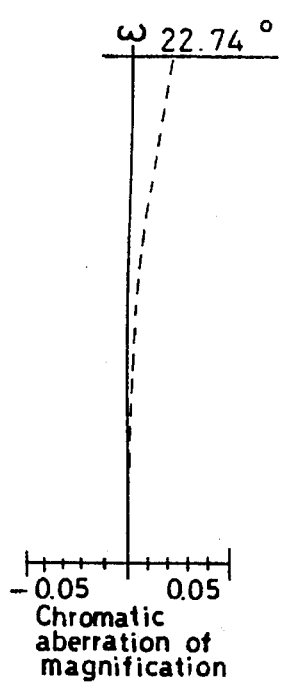
Figure 5A:
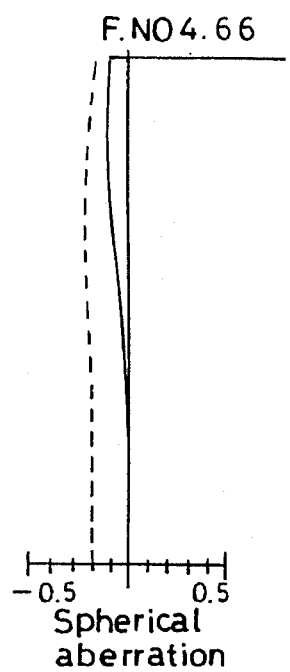
Figure 5B:
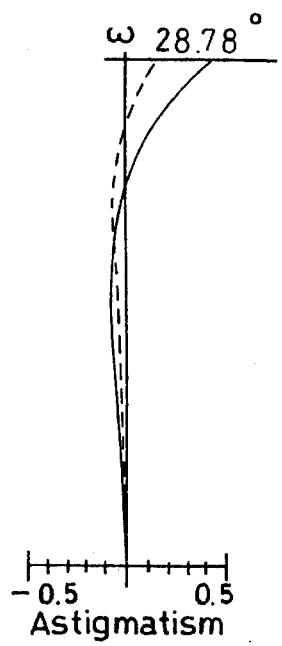
Figure 5C:
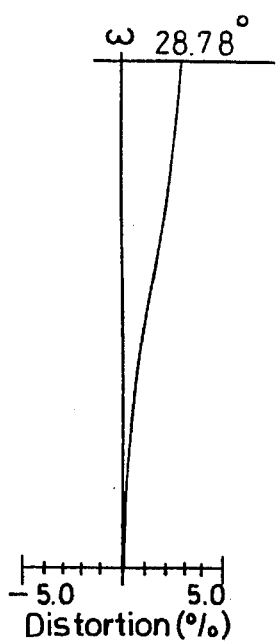
Figure 5D:
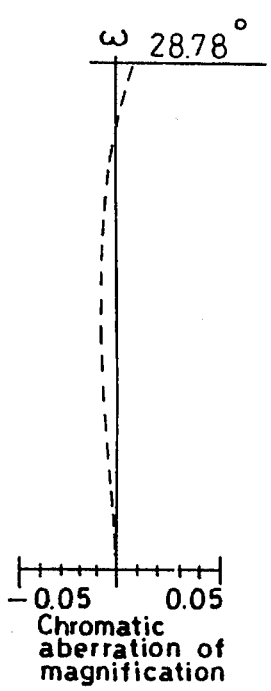
Figure 5E:
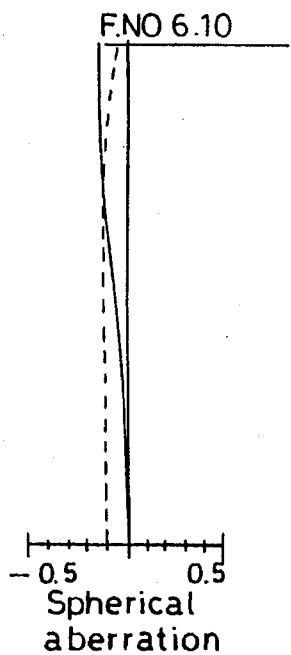
Figure 5F:
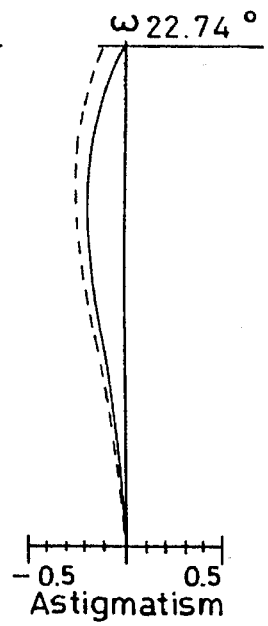
Figure 5G:
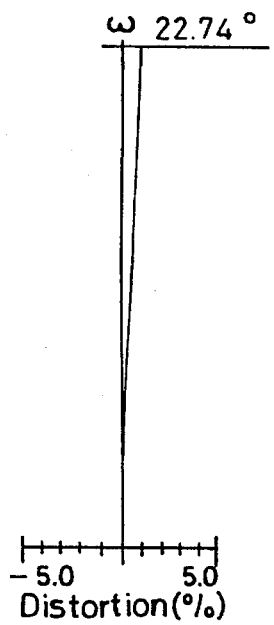
Figure 5H:
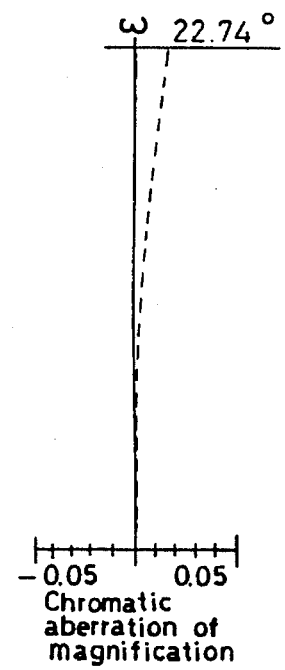
Figure 6A:
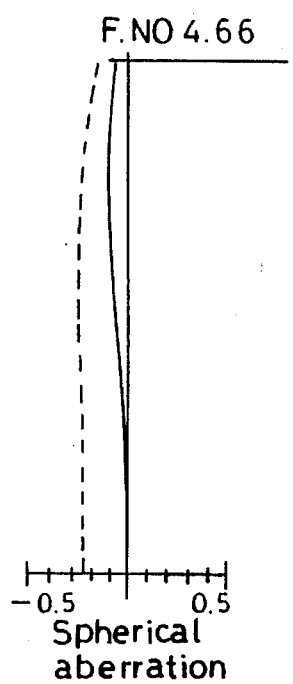
Figure 6B:
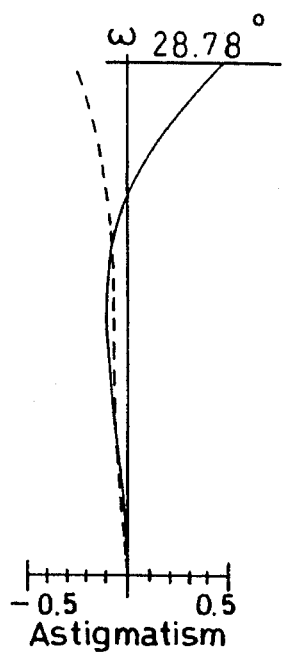
Figure 6C:
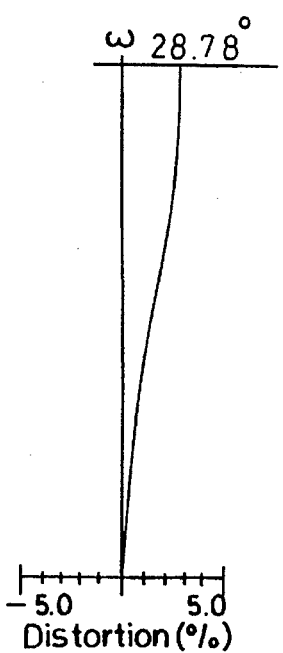
Figure 6D:
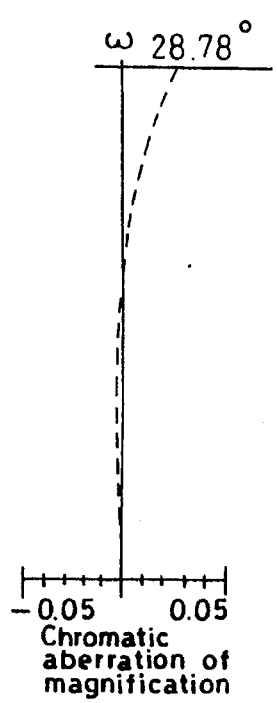
Figure 6E:
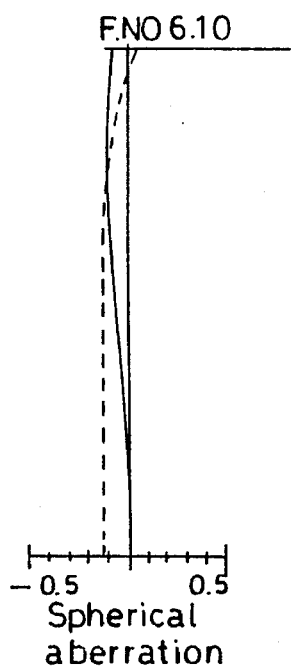
Figure 6F:
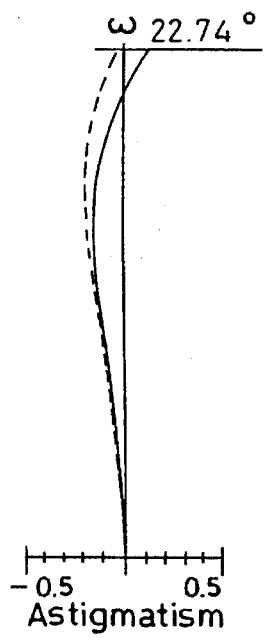
Figure 6G:
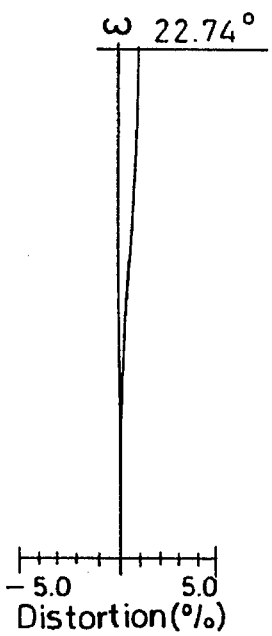
Figure 6H:
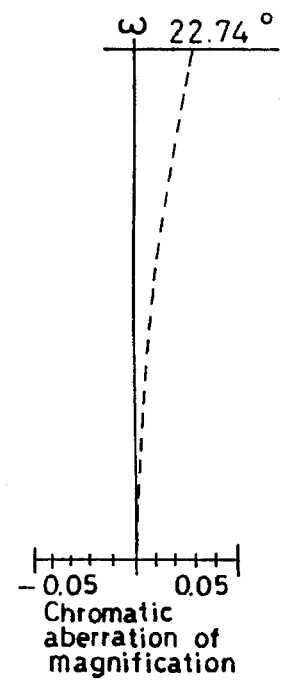
Figure 7A:
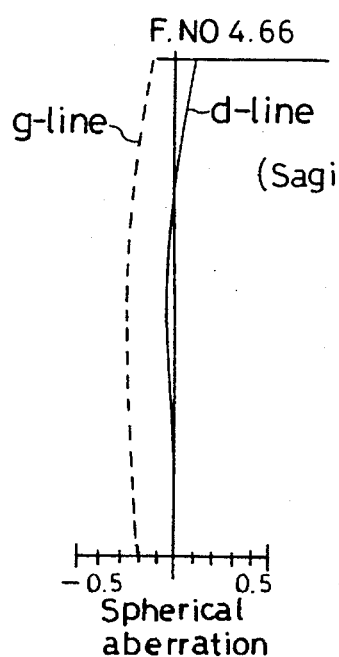
Figure 7B:
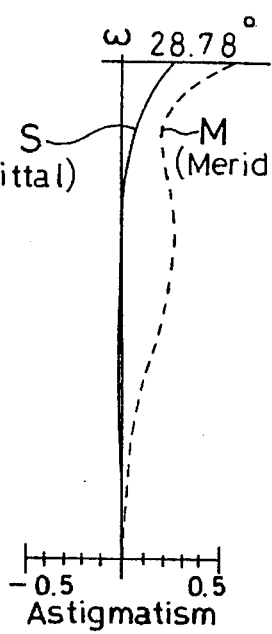
Figure 7C:
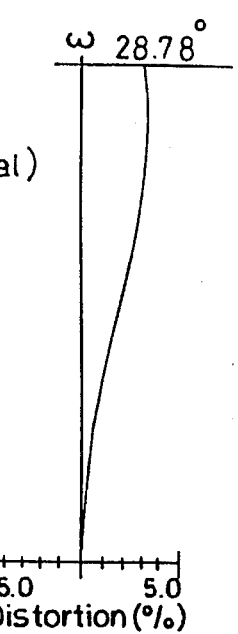
Figure 7D:
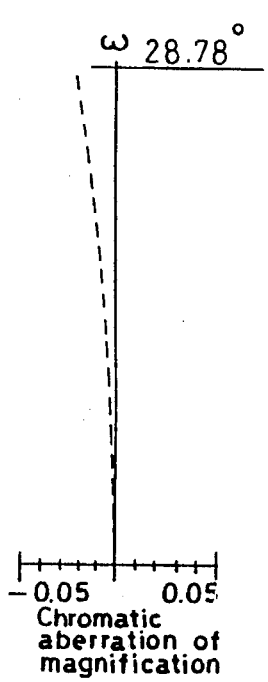
Figure 7E:
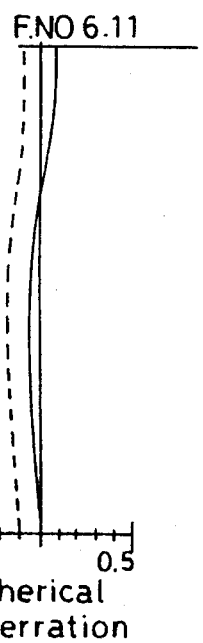
Figure 7F:
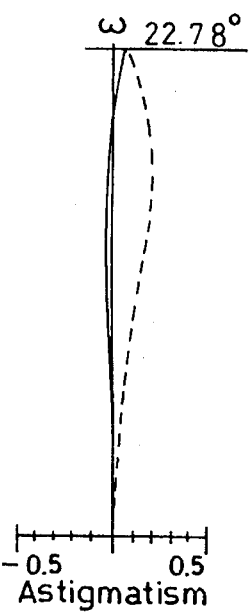
Figure 7G:
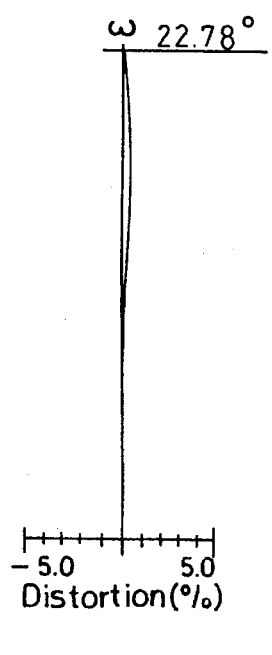
Figure 7H:
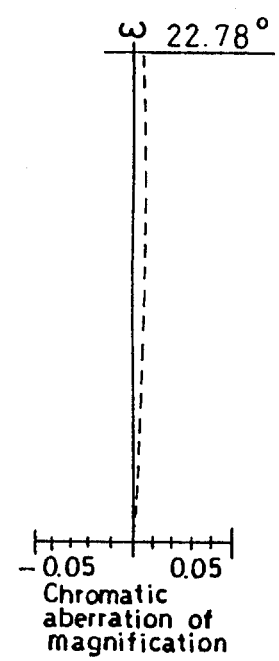
Figure 7I:
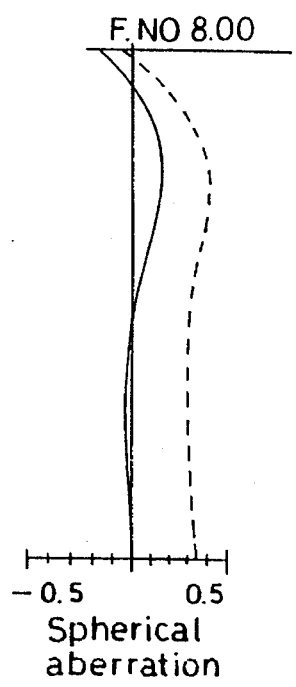
Figure 7J:
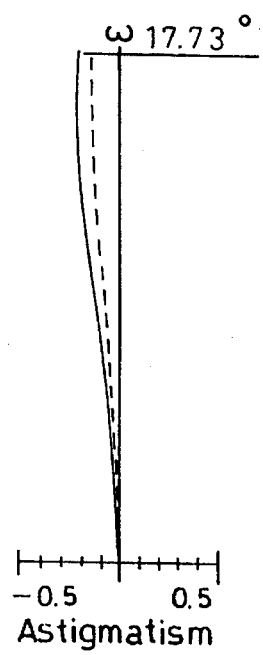
Figure 7K:
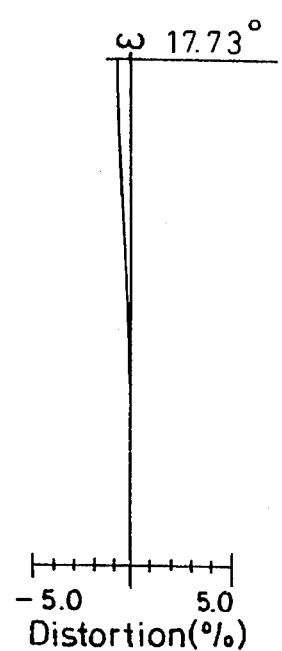
Figure 7L:
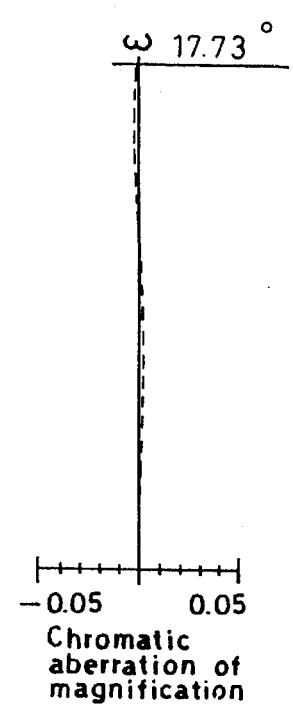
Figure 8A:
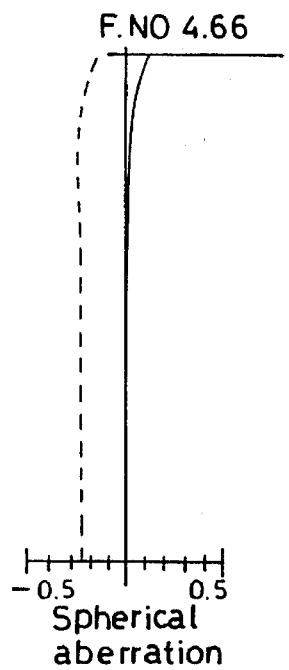
Figure 8B:
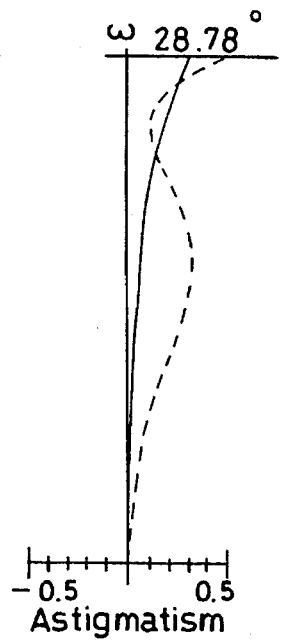
Figure 8C:
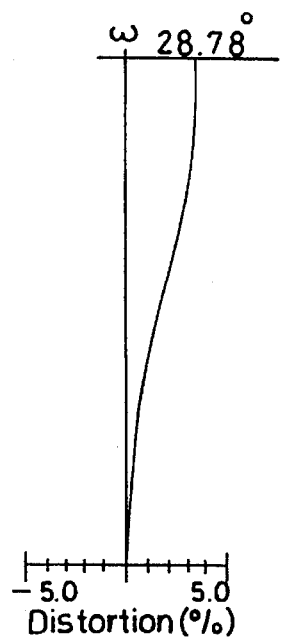
Figure 8D:
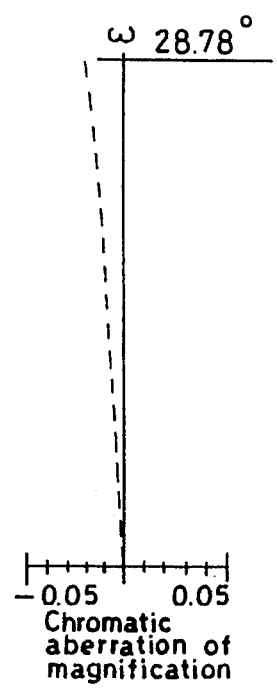
Figure 8E:
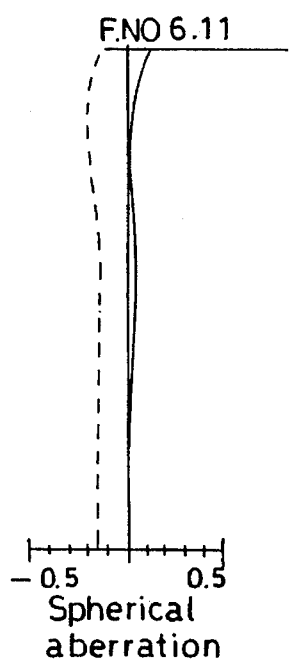
Figure 8F:
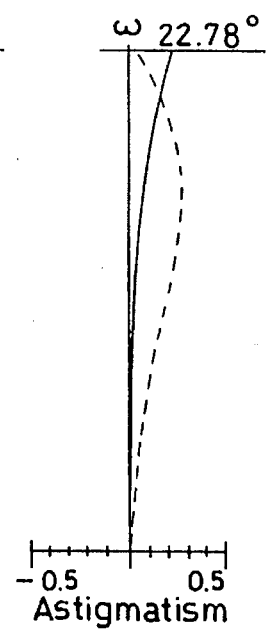
Figure 8G:
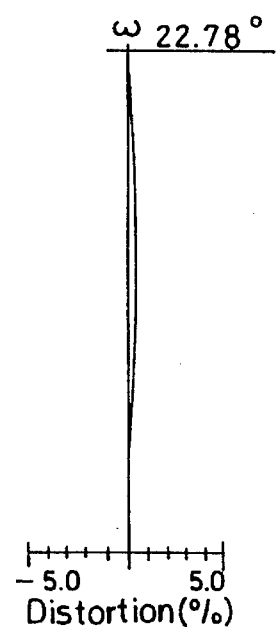
Figure 8H:
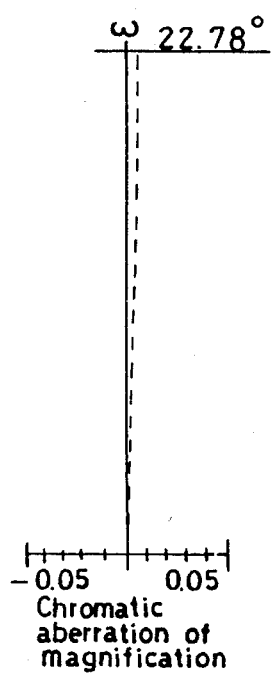
Figure 8I:
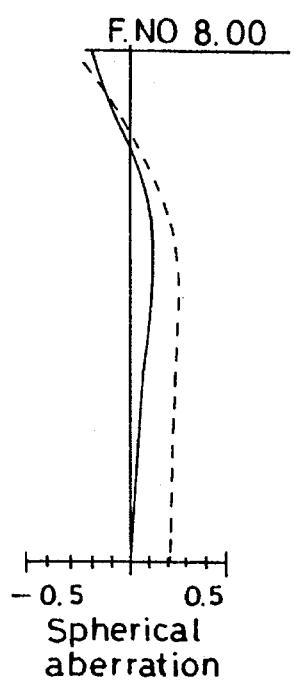
Figure 8J:
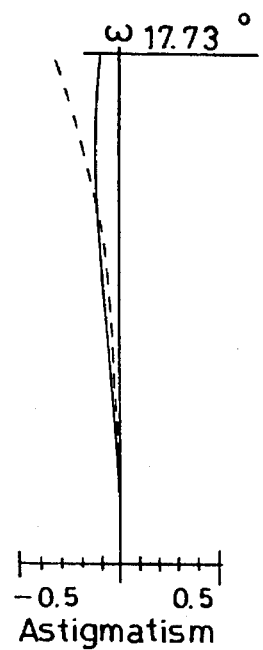
Figure 8K:
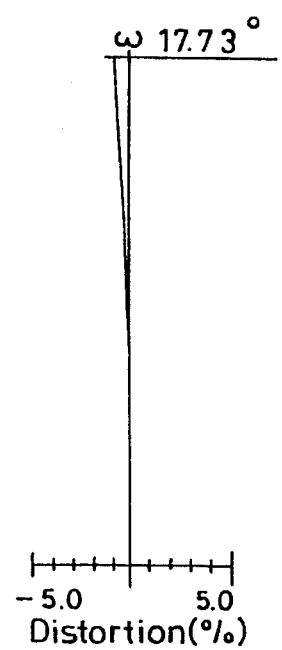
Figure 8L:
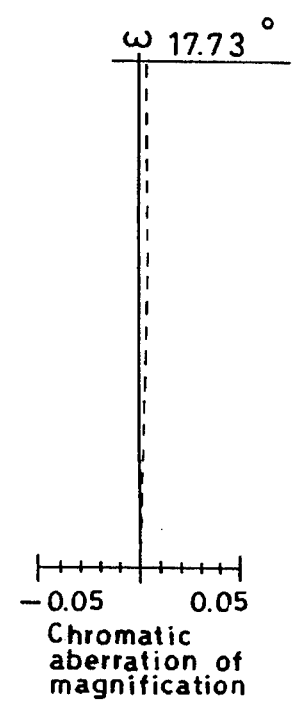
Figure 9A:
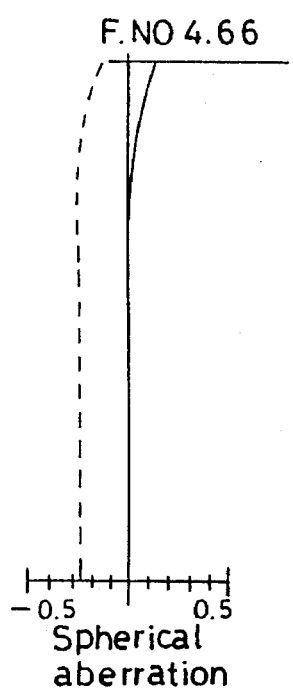
Figure 9B:
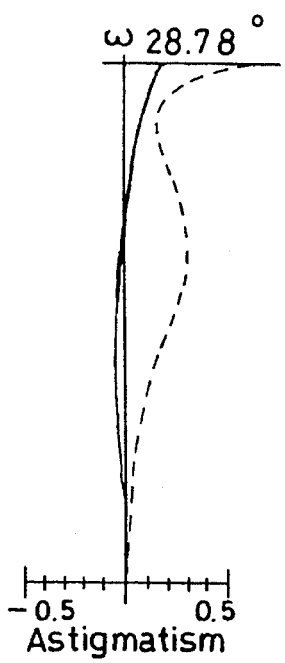
Figure 9C:
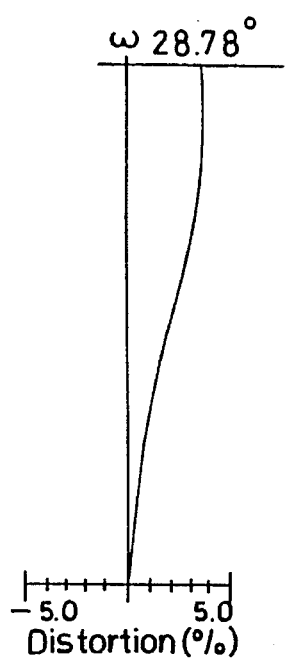
Figure 9D:
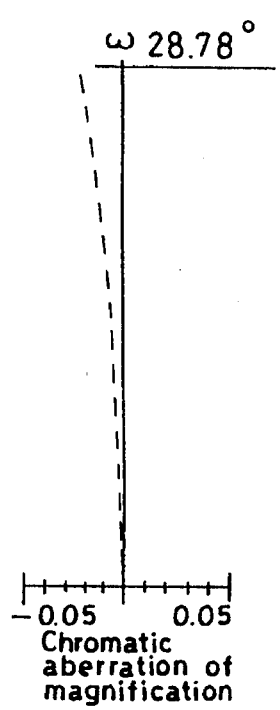
Figure 9E:
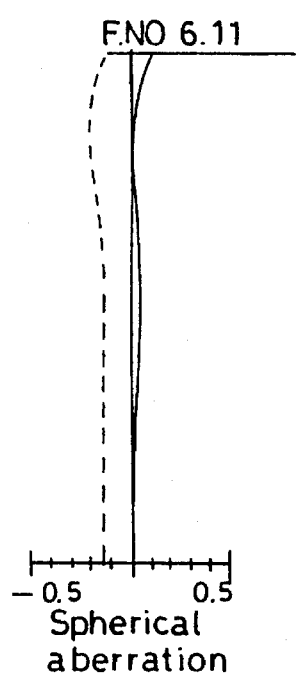
Figure 9F:
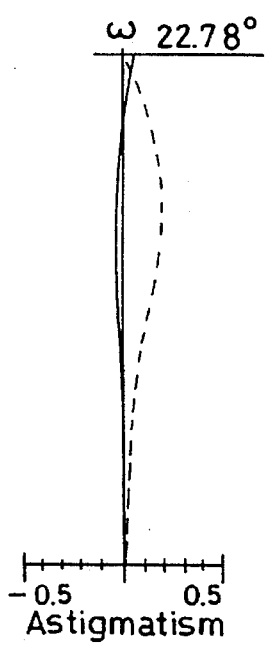
Figure 9G:
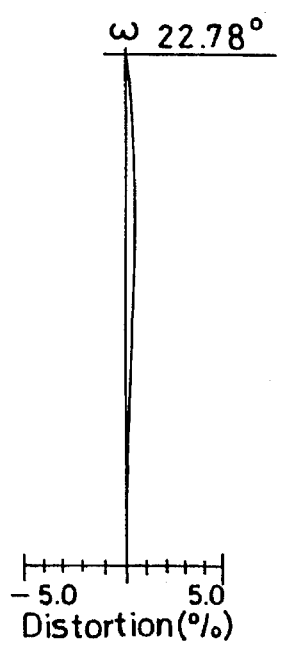
Figure 9H:
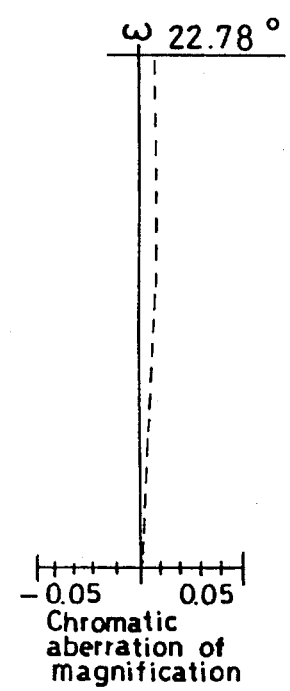
Figure 10A:
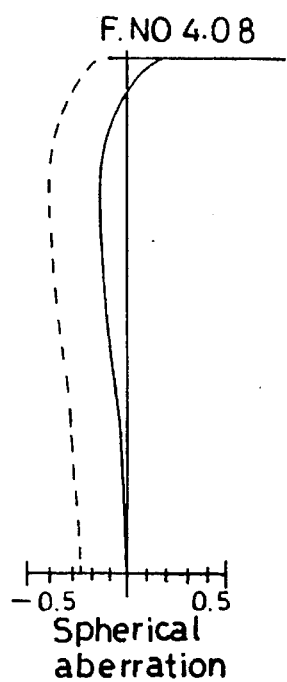
Figure 10B:
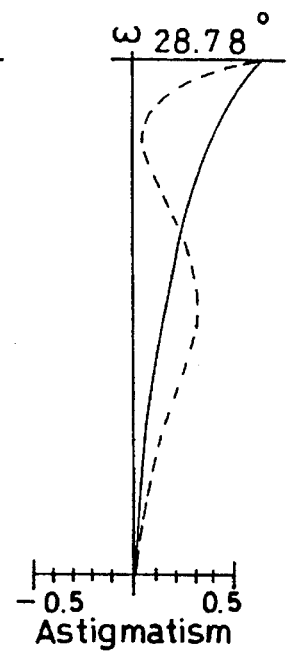
Figure 10C:
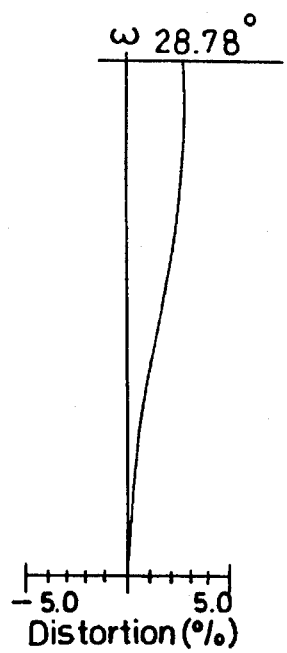
Figure 10D:
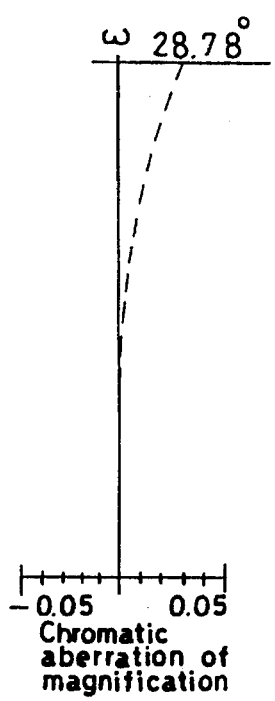
Figure 10E:
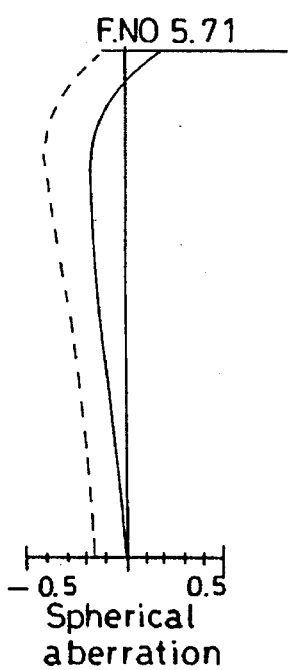
Figure 10F:
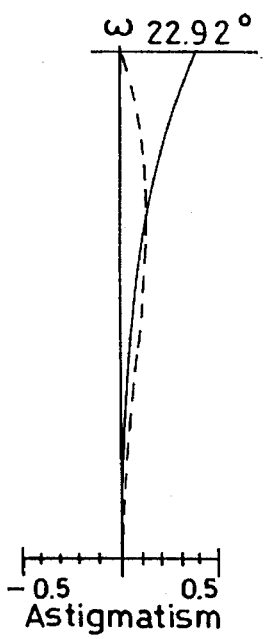
Figure 10G:
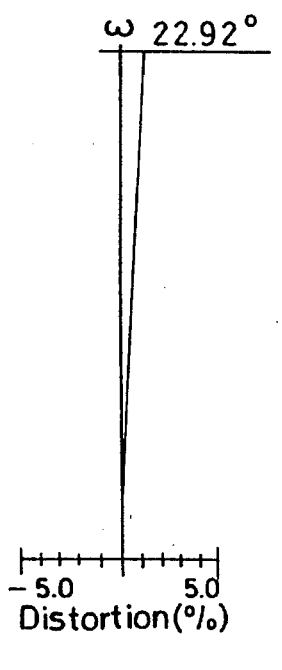
Figure 10H:
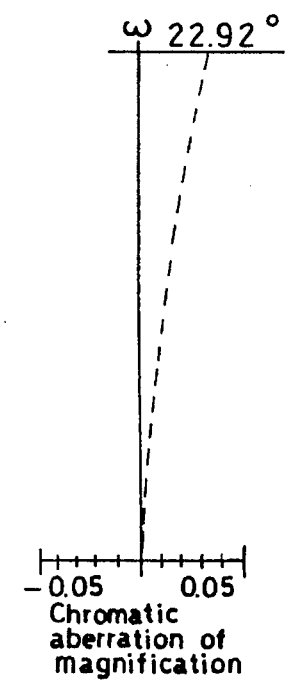
Figure 10I:
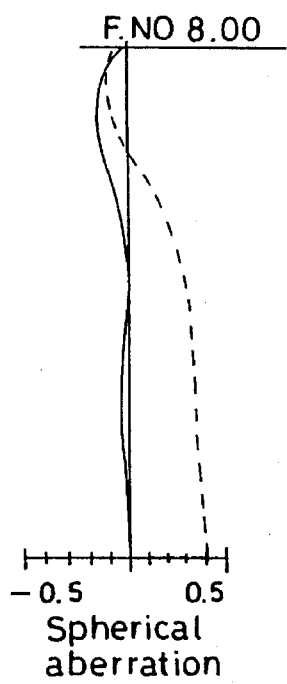
Figure 10J:
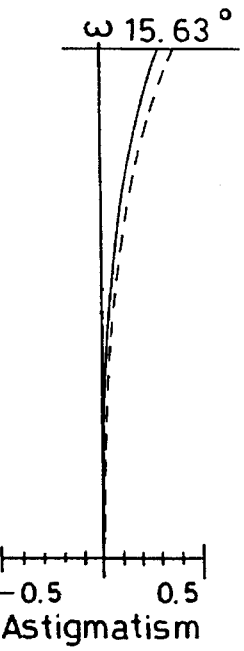
Figure 10K:
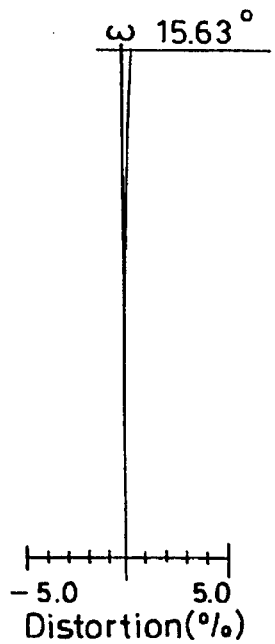
Figure 10L:
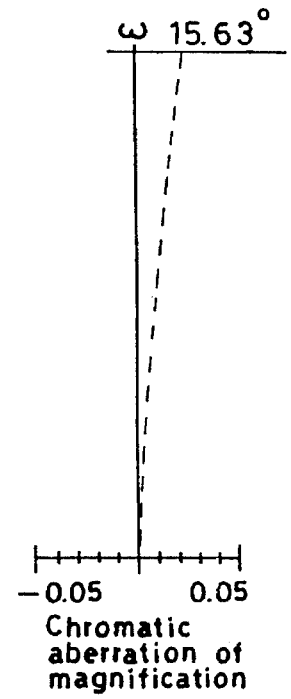

In the following description, the invention will be explained with reference to Examples 1–8, the lens data of which will be enumerated. A sectional lens arrangement of Example 1 at the wide-angle (a) and telephoto (b) ends is shown in FIG. 1, and a similar lens arrangement of Example 2 is presented in FIG. 2. Sectional lens arrangements of Examples 2–4 are not illustrated because of being nearly similar to that of FIG. 1, and sectional lens arrangements of Examples 6–8 are not again shown because of being nearly similar to that of FIG. 2.

Referring now to the configuration and location of each lens, the first unit I of Example 1 consists of a positive meniscus lens L1, a double-concave lens L2, a double-convex lens L3, a double-convex lens L4 and a stop, and the second unit II thereof consists of a positive meniscus lens L5 convex on the image side and a negative meniscus lens L6 convex on the image side. Examples 2 and 3 each follow Example 1 with the exception that the third lens L3 of the first unit I consists of a plano-convex lens and Example 4 follows Example 1 with the exception that the third lens L3 of the first unit I consists of a positive meniscus lens convex on the image side. In each of Example 5 and 8, the first unit I consists of a positive meniscus lens L1 convex on the image side, a double-concave lens L1, a double-convex lens L3, a positive meniscus lens L4 that is slightly convex on the image side and a stop, and the second unit II consists of a positive meniscus lens L5 convex on the image side and a negative meniscus lens L6 convex on the image side. Examples 6 and 7 each follow Example 5 and 8 with the exception that the fourth lens L4 of the first unit I consists of a negative meniscus lens that is slightly convex on the image side.

Referring then to the aspherical surfaces used in the invention, each of Examples 1 and 4 uses one aspherical surface for the surface of the positive meniscus lens L5 of the second unit II that faces the object side, Example 2 uses two aspherical surfaces for both surfaces of the positive meniscus lens L5, and Example 3 uses one aspherical surface for the positive meniscus lens L5. In each of Examples 5–8, two aspherical surfaces are applied to the surface of the fourth lens L4 of the first unit I that faces the image side and the surface of the first lens L5 of the second unit II that faces the object side.

Throughout Examples 1–8, it is noted that a plastic lens is applied to the positive meniscus lens L5 of the first unit II. In each of Examples 5–8, it is also noted that a plastic lens is applied to the double-convex lens L4 of the first unit I.

In the ensuing lens data of Examples 1–4, symbols used but not hereinbefore have the following meanings: f is the focal length of the total system, $F_{No}$ is the F-number, $2\omega$ is the field angle, $f_B$ is the back focus, $r_1, r_2, \ldots$ are the radii of curvature of the respective lens surfaces, $d_1, d_2, \ldots$ are the spaces between the respective lens surfaces, $n_{d1}, n_{d2}, \ldots$ are the d-line indices of refraction of the respective lenses, and $v_{d1}, v_{d2}, \ldots$ are the Abbe's numbers of the respective lenses. The aspherical configuration applied, when x denotes the optical direction and y stands for the direction normal to the optical axis, is expressed by the following formula:

$$x = (y^2/r)/[1 + \{1 - P(y^2/r^2)\}^{1/2}] + A_4 y^4 + A_6 y^6 + A_8 y^8 + A_{10} y^{10}$$

where r is the paraxial radius of curvature, P is the conical coefficient and $A_4, A_6, A_8$ and $A_{10}$ are the aspherical coefficients.

Example 1 f = 39.33~51.54~67.55
$F_{NO}$ = 4.66~6.10~8.00
$2\omega$ = 57.55°~45.48°~35.46°
$f_B$ = 9.77~22.42~39.01

| | | | |
|---|---|---|---|
| $r_1$ = 16.6160 | $d_1$ = 2.5000 | $n_{d1}$ = 1.69680 | $v_{d1}$ = 56.49 |
| $r_2$ = 73.1490 | $d_2$ = 1.3000 | | |
| $r_3$ = −20.4300 | $d_3$ = 1.2000 | $n_{d2}$ = 1.83400 | $v_{d2}$ = 37.16 |

-continued

| | | | |
|---|---|---|---|
| $r_4 = 29.2200$ | $d_4 = 1.7900$ | | |
| $r_5 = 186.9680$ | $d_5 = 3.9100$ | $n_{d3} = 1.51633$ | $v_{d3} = 64.15$ |
| $r_6 = -14.8230$ | $d_6 = 0.1500$ | | |
| $r_7 = 41.4470$ | $d_7 = 2.0000$ | $n_{d4} = 1.54072$ | $v_{d4} = 47.20$ |
| $r_8 = -42.1360$ | $d_8 = 0.8000$ | | |
| $r_9 = \infty$ (Stop) | $d_9$ = (Variable) | | |
| $r_{10} = -23.8790$ | $d_{10} = 2.5000$ | $n_{d5} = 1.49241$ | $v_{d5} = 57.66$ |
| (Aspheric) | | | |
| $r_{11} = -18.6680$ | $d_{11} = 6.3200$ | | |
| $r_{12} = -11.8220$ | $d_{12} = 1.6000$ | $n_{d6} = 1.72916$ | $v_{d6} = 54.68$ |
| $r_{13} = -36.3990$ | | | |

Zooming Spaces

| f | 39.33 | 51.54 | 67.55 |
|---|---|---|---|
| $d_9$ | 12.041 | 6.908 | 2.989 |

Aspherical Coefficients

10th surface $P = 0.9964$
$A_4 = 0.34157 \times 10^{-4}$
$A_6 = 0.27370 \times 10^{-6}$
$A_8 = 0.46638 \times 10^{-9}$
$f_1/f_w = 0.729$
$|f_2/f_w| = 0.756$
$|d_{11}/f_2| = 0.213$
$|f_{L5}/f_2| = 5.047$
$v_{L5} = 57.66$ Example 2

$f = 39.33 \sim 51.54 \sim 67.55$
$F_{NO} = 4.66 \sim 6.10 \sim 8.00$
$2\omega = 57.55° \sim 45.48° \sim 35.46°$
$f_B = 10.06 \sim 22.94 \sim 39.83$

| | | | |
|---|---|---|---|
| $r_1 = 16.7830$ | $d_1 = 2.7800$ | $n_{d1} = 1.69680$ | $v_{d1} = 56.49$ |
| $r_2 = 103.2480$ | $d_2 = 1.3100$ | | |
| $r_3 = -22.0920$ | $d_3 = 1.2000$ | $n_{d2} = 1.83400$ | $v_{d2} = 37.16$ |
| $r_4 = 29.1640$ | $d_4 = 2.3500$ | | |
| $r_5 = \infty$ | $d_5 = 3.4800$ | $n_{d3} = 1.51633$ | $v_{d3} = 64.15$ |
| $r_6 = -14.9760$ | $d_6 = 0.1500$ | | |
| $r_7 = 39.5820$ | $d_7 = 2.5700$ | $n_{d4} = 1.53172$ | $v_{d4} = 48.90$ |
| $r_8 = -54.4780$ | $d_8 = 0.8000$ | | |
| $r_9 = \infty$ (Stop) | $d_9$ = (Variable) | | |
| $r_{10} = -45.2930$ | $d_{10} = 3.1800$ | $n_{d5} = 1.49241$ | $v_{d5} = 57.66$ |
| (Aspheric) | | | |
| $r_{11} = -17.9690$ | $d_{11} = 3.8200$ | | |
| (Aspheric) | | | |
| $r_{12} = -12.2210$ | $d_{12} = 1.6000$ | $n_{d6} = 1.72916$ | $v_{d6} = 54.68$ |
| $r_{13} = -86.9650$ | | | |

Zooming Spaces

| f | 39.33 | 51.54 | 67.55 |
|---|---|---|---|
| $d_9$ | 13.065 | 7.359 | 3.002 |

Aspherical Coefficients

10th surface $P = 1.0000$
$A_4 = -0.21944 \times 10^{-5}$
$A_6 = 0.37635 \times 10^{-6}$
$A_8 = -0.67287 \times 10^{-8}$ 11th surface $P = 0.9895$
$A_4 = -0.33747 \times 10^{-4}$
$A_6 = 0.30389 \times 10^{-6}$
$A_8 = -0.79252 \times 10^{-8}$
$f_1/f_w = 0.762$
$|f_2/f_w| = 0.804$
$|d_{11}/f_2| = 0.121$
$|f_{L5}/f_2| = 1.842$
$v_{L5} = 57.66$ Example 3

$f = 39.33 \sim 51.54 \sim 67.55$
$F_{NO} = 4.66 \sim 6.10 \sim 8.00$
$2\omega = 57.55° \sim 45.48° \sim 35.46°$
$f_B = 9.86 \sim 22.69 \sim 39.51$

| | | | |
|---|---|---|---|
| $r_1 = 16.9290$ | $d_1 = 2.5700$ | $n_{d1} = 1.69680$ | $v_{d1} = 56.49$ |

-continued

| | | | |
|---|---|---|---|
| $r_2 = 96.5320$ | $d_2 = 1.3000$ | | |
| $r_3 = -21.7680$ | $d_3 = 1.2000$ | $n_{d2} = 1.83400$ | $v_{d2} = 37.16$ |
| $r_4 = 30.1270$ | $d_4 = 2.2800$ | | |
| $r_5 = \infty$ | $d_5 = 3.6100$ | $n_{d3} = 1.48749$ | $v_{d3} = 70.20$ |
| $r_6 = -15.0470$ | $d_6 = 0.1500$ | | |
| $r_7 = 41.4680$ | $d_7 = 2.0100$ | $n_{d4} = 1.54072$ | $v_{d4} = 47.20$ |
| $r_8 = -41.4430$ | $d_8 = 0.8000$ | | |
| $r_9 = \infty$ (Stop) | $d_9$ = (Variable) | | |
| $r_{10} = -25.0680$ | $d_{10} = 2.5000$ | $n_{d5} = 1.49241$ | $v_{d5} = 57.66$ |
| $r_{11} = -17.1560$ | $d_{11} = 5.6200$ | | |
| (Aspheric) | | | |
| $r_{12} = -12.7140$ | $d_{12} = 1.6000$ | $n_{d6} = 1.72916$ | $v_{d6} = 54.68$ |
| $r_{13} = -54.6230$ | | | |

Zooming Spaces

| f | 39.33 | 51.54 | 67.55 |
|---|---|---|---|
| $d_9$ | 12.620 | 7.160 | 2.991 |

Aspherical Coefficients

11th surface $P = 0.9285$
$A_4 = -0.19934 \times 10^{-4}$
$A_6 = -0.88594 \times 10^{-7}$
$A_8 = -0.15156 \times 10^{-8}$
$f_1/f_w = 0.747$
$|f_2/f_w| = 0.785$
$|d_{11}/f_2| = 0.182$
$|f_{L5}/f_2| = 3.239$
$v_{L5} = 57.66$ Example 4

$f = 39.33 \sim 51.54 \sim 67.55$
$F_{NO} = 4.66 \sim 6.10 \sim 8.00$
$2\omega = 57.55° \sim 45.48° \sim 35.46°$
$f_B = 10.88 \sim 23.84 \sim 40.83$

| | | | |
|---|---|---|---|
| $r_1 = 17.2530$ | $d_1 = 2.4200$ | $n_{d1} = 1.69680$ | $v_{d1} = 56.49$ |
| $r_2 = 70.6770$ | $d_2 = 1.5300$ | | |
| $r_3 = -18.1360$ | $d_3 = 1.2000$ | $n_{d2} = 1.83400$ | $v_{d2} = 37.16$ |
| $r_4 = 38.5580$ | $d_4 = 2.0100$ | | |
| $r_5 = -140.6470$ | $d_5 = 2.4700$ | $n_{d3} = 1.56384$ | $v_{d3} = 60.69$ |
| $r_6 = -13.8900$ | $d_6 = 0.1500$ | | |
| $r_7 = 35.0130$ | $d_7 = 3.0200$ | $n_{d4} = 1.53358$ | $v_{d4} = 51.56$ |
| $r_8 = -43.0570$ | $d_8 = 0.8000$ | | |
| $r_9 = \infty$ (Stop) | $d_9$ = (Variable) | | |
| $r_{10} = -34.5070$ | $d_{10} = 3.5000$ | $n_{d5} = 1.49241$ | $v_{d5} = 57.66$ |
| (Aspheric) | | | |
| $r_{11} = -17.2870$ | $d_{11} = 3.7400$ | | |
| $r_{12} = -11.0770$ | $d_{12} = 1.6000$ | $n_{d6} = 1.72916$ | $v_{d6} = 54.68$ |
| $r_{13} = -46.5560$ | | | |

Zooming Spaces

| f | 39.33 | 51.54 | 67.55 |
|---|---|---|---|
| $d_9$ | 12.105 | 6.930 | 2.980 |

Aspherical Coefficients

10th surface $P = 1.0105$
$A_4 = 0.46580 \times 10^{-4}$
$A_6 = 0.18948 \times 10^{-6}$
$A_8 = 0.23569 \times 10^{-8}$
$f_1/f_w = 0.723$
$|f_2/f_w| = 0.768$
$|d_{11}/f_2| = 0.124$
$|f_{L5}/f_2| = 2.183$
$v_{L5} = 57.66$ Example 5

$f = 39.33 \sim 51.58 \sim 67.55$
$F_{NO} = 4.66 \sim 6.10 \sim 8.00$
$2\omega = 57.55° \sim 45.55° \sim 35.46°$
$f_B = 9.80 \sim 22.74 \sim 39.70$

| | | | |
|---|---|---|---|
| $r_1 = 19.4392$ | $d_1 = 2.012$ | $n_{d1} = 1.69680$ | $v_{d1} = 56.49$ |
| $r_2 = 39.7616$ | $d_2 = 1.268$ | | |
| $r_3 = -26.9008$ | $d_3 = 1.200$ | $n_{d2} = 1.83400$ | $v_{d2} = 37.16$ |
| $r_4 = 58.0668$ | $d_4 = 3.518$ | | |
| $r_5 = 17.8053$ | $d_5 = 3.790$ | $n_{d3} = 1.56873$ | $v_{d3} = 63.16$ |
| $r_6 = -22.2958$ | $d_6 = 0.200$ | | |

-continued

| $r_7 = -36.0747$ | $d_7 = 1.854$ | $n_{d4} = 1.49241$ | $v_{d4} = 57.66$ |
| $r_8 = -31.9980$ | $d_8 = 0.800$ | | |
| (Aspheric) | | | |
| $r_9 = \infty$ (Stop) | $d_9$ = (Variable) | | |
| $r_{10} = -28.2264$ | $d_{10} = 2.500$ | $n_{d5} = 1.49241$ | $v_{d5} = 57.66$ |
| (Aspheric) | | | |
| $r_{11} = -24.3908$ | $d_{11} = 5.717$ | | |
| $r_{12} = -8.6864$ | $d_{12} = 1.600$ | $n_{d6} = 1.72916$ | $v_{d6} = 54.68$ |
| $r_{13} = -16.7013$ | | | |

Zooming Spaces

| f | 39.33 | 51.58 | 67.55 |
| --- | --- | --- | --- |
| $d_9$ | 11.6382 | 6.739 | 3.0000 |

Aspherical Coefficients

8th surface $P = 7.4100$
$A_4 = 0.11309 \times 10^{-3}$
$A_6 = 0.13273 \times 10^{-5}$
$A_8 = -0.46037 \times 10^{-7}$
$A_{10} = 0.78617 \times 10^{-9}$ 10th surface $P = 1.7454$
$A_4 = 0.10979 \times 10^{-3}$
$A_6 = 0.51310 \times 10^{-6}$
$A_8 = 0.17687 \times 10^{-7}$
$A_{10} = -0.13947 \times 10^{-9}$
$f_1/f_w = 0.704$
$|f_2/f_w| = 0.746$
$|d_{11}/f_2| = 0.195$
$|f_{L4}/f_1| = 18.05$
$|f_{L5}/f_2| = 10.22$
$v_{L5} = 57.66$ Example 6

$f = 39.33 \sim 51.54 \sim 67.55$
$F_{NO} = 4.66 \sim 6.10 \sim 8.00$
$2\omega = 57.55° \sim 45.55° \sim 35.46°$
$f_B = 9.43 \sim 22.36 \sim 39.31$

| $r_1 = 18.0512$ | $d_1 = 2.012$ | $n_{d1} = 1.69680$ | $v_{d1} = 56.49$ |
| $r_2 = 28.1604$ | $d_2 = 1.891$ | | |
| $r_3 = -28.0804$ | $d_3 = 1.200$ | $n_{d2} = 1.83400$ | $v_{d2} = 37.16$ |
| $r_4 = 59.6799$ | $d_4 = 3.924$ | | |
| $r_5 = 15.3885$ | $d_5 = 3.862$ | $n_{d3} = 1.56873$ | $v_{d3} = 63.16$ |
| $r_6 = -20.5545$ | $d_6 = 0.200$ | | |
| $r_7 = -28.3590$ | $d_7 = 2.007$ | $n_{d4} = 1.49241$ | $v_{d4} = 57.66$ |
| $r_8 = -40.7578$ | $d_8 = 0.800$ | | |
| (Aspheric) | | | |
| $r_9 = \infty$ (Stop) | $d_9$ = (Variable) | | |
| $r_{10} = -25.6160$ | $d_{10} = 2.500$ | $n_{d5} = 1.49241$ | $v_{d5} = 57.66$ |
| (Aspheric) | | | |
| $r_{11} = -19.6677$ | $d_{11} = 5.753$ | | |
| $r_{12} = -9.5000$ | $d_{12} = 1.600$ | $n_{d6} = 1.72916$ | $v_{d6} = 54.68$ |
| $r_{13} = -20.9617$ | | | |

Zooming Spaces

| f | 39.33 | 51.54 | 67.55 |
| --- | --- | --- | --- |
| $d_9$ | 12.2917 | 6.997 | 3.0000 |

Aspherical Coefficients

8th surface $P = -0.5548$
$A_4 = 0.12563 \times 10^{-3}$
$A_6 = 0.30301 \times 10^{-6}$
$A_8 = -0.14315 \times 10^{-7}$
$A_{10} = 0.78487 \times 10^{-9}$ 10th surface $P = 4.2708$
$A_4 = 0.10494 \times 10^{-3}$
$A_6 = 0.25702 \times 10^{-6}$
$A_8 = 0.19256 \times 10^{-7}$
$A_{10} = -0.17429 \times 10^{-9}$
$f_1/f_w = 0.731$
$|f_2/f_w| = 0.774$
$|d_{11}/f_2| = 0.189$ -continued $|f_{L4}/f_1| = 6.958$
$|f_{L5}/f_2| = 4.964$
$v_{L5} = 57.66$ Example 7

$f = 39.33 \sim 51.54 \sim 67.55$
$F_{NO} = 4.66 \sim 6.10 \sim 8.00$
$2\omega = 57.55° \sim 45.55° \sim 35.46°$
$f_B = 9.44 \sim 22.64 \sim 39.93$

| $r_1 = 19.2398$ | $d_1 = 2.0118$ | $n_{d1} = 1.69680$ | $v_{d1} = 56.49$ |
| $r_2 = 33.3467$ | $d_2 = 1.3845$ | | |
| $r_3 = -27.3753$ | $d_3 = 1.2000$ | $n_{d2} = 1.83400$ | $v_{d2} = 37.16$ |
| $r_4 = 72.5840$ | $d_4 = 3.6613$ | | |
| $r_5 = 17.0396$ | $d_5 = 3.7994$ | $n_{d3} = 1.56873$ | $v_{d3} = 63.16$ |
| $r_6 = -21.7216$ | $d_6 = 0.2000$ | | |
| $r_7 = -32.1490$ | $d_7 = 1.8845$ | $n_{d4} = 1.49241$ | $v_{d4} = 57.66$ |
| $r_8 = -36.1417$ | $d_8 = 0.8000$ | | |
| (Aspheric) | | | |
| $r_9 = \infty$ (Stop) | $d_9$ = (Variable) | | |
| $r_{10} = -29.3331$ | $d_{10} = 2.5000$ | $n_{d5} = 1.49241$ | $v_{d5} = 57.66$ |
| (Aspheric) | | | |
| $r_{11} = -24.4821$ | $d_{11} = 5.7268$ | | |
| $r_{12} = -8.6836$ | $d_{12} = 1.6000$ | $n_{d6} = 1.72916$ | $v_{d6} = 54.68$ |
| $r_{13} = -16.4555$ | | | |

Zooming Spaces

| f | 39.33 | 51.54 | 67.55 |
| --- | --- | --- | --- |
| $d_9$ | 12.198 | 6.982 | 3.000 |

Aspherical Coefficients

8th surface $P = 7.9871$
$A_4 = 0.12369 \times 10^{-3}$
$A_6 = 0.25643 \times 10^{-6}$
$A_8 = -0.12788 \times 10^{-7}$
$A_{10} = 0.70669 \times 10^{-9}$ 10th surface $P = 1.8131$
$A_4 = 0.11014 \times 10^{-3}$
$A_6 = 0.38033 \times 10^{-6}$
$A_8 = 0.18852 \times 10^{-7}$
$A_{10} = -0.11932 \times 10^{-9}$
$f_1/f_w = 0.720$
$|f_2/f_w| = 0.780$
$|d_{11}/f_2| = 0.187$
$|f_{L4}/f_1| = 24.724$
$|f_{L5}/f_2| = 8.400$
$v_{L5} = 57.66$ Example 8

$f = 39.33 \sim 55.10 \sim 77.20$
$F_{NO} = 4.08 \sim 5.71 \sim 8.00$
$2\omega = 57.55° \sim 45.83° \sim 31.26°$
$f_B = 10.40 \sim 24.29 \sim 43.76$

| $r_1 = 19.0063$ | $d_1 = 2.0118$ | $n_{d1} = 1.64250$ | $v_{d1} = 58.37$ |
| $r_2 = 38.5640$ | $d_2 = 1.3087$ | | |
| $r_3 = -22.9994$ | $d_3 = 1.2000$ | $n_{d2} = 1.83400$ | $v_{d2} = 37.16$ |
| $r_4 = 107.0105$ | $d_4 = 3.9634$ | | |
| $r_5 = 17.3615$ | $d_5 = 4.0000$ | $n_{d3} = 1.52542$ | $v_{d3} = 64.55$ |
| $r_6 = -21.9148$ | $d_6 = 0.2000$ | | |
| $r_7 = -45.5956$ | $d_7 = 1.7893$ | $n_{d4} = 1.49241$ | $v_{d4} = 57.66$ |
| $r_8 = -31.0525$ | $d_8 = 0.8000$ | | |
| (Aspheric) | | | |
| $r_9 = \infty$ (Stop) | $d_9$ = (Variable) | | |
| $r_{10} = -59.2540$ | $d_{10} = 2.5000$ | $n_{d5} = 1.49241$ | $v_{d5} = 57.66$ |
| (Aspheric) | | | |
| $r_{11} = -27.6428$ | $d_{11} = 5.0940$ | | |
| $r_{12} = -9.9000$ | $d_{12} = 1.6000$ | $n_{d6} = 1.72916$ | $v_{d6} = 54.68$ |
| $r_{13} = -38.8545$ | | | |

Zooming Spaces

| f | 39.33 | 55.10 | 77.20 |
| --- | --- | --- | --- |
| $d_9$ | 10.985 | 6.326 | 3.000 |

Aspherical Coefficients

8th surface

-continued

P = 21.7285
$A_4 = 0.18022 \times 10^{-3}$
$A_6 = 0.18211 \times 10^{-5}$
$A_8 = -0.24109 \times 10^{-7}$
$A_{10} = 0.13635 \times 10^{-8}$
10th surface P = 39.2266
$A_4 = 0.98006 \times 10^{-4}$
$A_6 = 0.47914 \times 10^{-6}$
$A_8 = 0.16619 \times 10^{-7}$
$A_{10} = -0.27174 \times 10^{-9}$
$f_1/f_w = 0.685$
$|f_2/f_w| = 0.604$
$|d_{11}/f_2| = 0.215$
$|f_{L4}/f_1| = 7.048$
$|f_{L5}/f_2| = 4.320$
$\nu_{L5} = 57.66$ Spherical aberrations, astigmatisms, distortions and chromatic aberrations of magnification of Examples 1–8 at the wide-angle ends (a), standard settings (b) and telephoto ends (c) are shown in the aberration diagrams of FIGS. 3–10.

As can be seen from the foregoing, a zoom lens system that comprises six lens groups or six lenses, has a zoom ratio of about 2 and is of good-enough performance can be achieved at low costs by meeting the structural requirements defined by the present invention.

It is understood that the zoom lens of the invention is suitable for lens shutter cameras, etc.

What we claim is:

1. A two-unit zoom lens system which comprises in order from the object side:
    a first lens unit including four lens elements and having a positive power as a whole, and in which a first lens element is a positive meniscus lens convex on the object side, a second lens element is a negative lens, a third lens element is a positive lens and a fourth lens element; and
    a second lens unit including a front lens element consisting of a positive meniscus lens convex on the image side and rear lens element convex on the image side, said rear lens element being spaced away from, and disposed opposite to, the image side of said front lens element, and said rear lens element consists of a negative meniscus lens convex on the image side, said second lens unit having negative power as a whole and being separated form said first lens unit by a space,
    said front lens element consisting of a plastic lens, and the space between said first and second lens units being variable for zooming, and
    said zoom lens system satisfying the condition:

$2.5 < |f_{L4}/f_1|$ where $f_1$ is the focal length of said first lens unit, and $f_{L4}$ is the focal length of said fourth lens element.

2. A two-unit zoom lens system as claimed in claim 1, wherein said fourth lens element consists of a meniscus lens convex on the image side.

3. A two-unit zoom lens system which comprises in order from the object side:
    a first lens unit including four lens elements and having a positive power as a whole, and in which a first lens element is a positive meniscus lens convex on the object side, a second lens element is a negative lens, a third lens element is a positive lens and a fourth lens element is a meniscus lens convex on the image side, and
    a second lens unit including a front lens element being a positive meniscus lens convex on the image side and a rear lens element being a negative meniscus lens convex on the image side and having a negative power as a whole, said second lens unit being separated from said first lens unit by a space,
    the space between said first and second lens units being variable for zooming,
    said fourth and front lens element each consisting of a plastic lens having an aspherical surface, and
    said two-unit zoom lens system conforming to the following conditions:

$0.6 < f_1/f_w < 0.9$;

$0.5 < |f_2/f_w| < 0.9$;

and $2.5 < |f_{L4}/f_1|$ where $f_1$ is the focal length of said first lens unit, $f_2$ is the focal length of said second lens unit, $f_{L4}$ is the focal length of said fourth lens element, and $f_W$ is the focal length of the total system at the wide-angle end.

* * * * *